(12) United States Patent
Mensh

(10) Patent No.: US 10,257,586 B1
(45) Date of Patent: Apr. 9, 2019

(54) SYSTEM AND METHOD FOR TIMING EVENTS UTILIZING VIDEO PLAYBACK ON A MOBILE DEVICE

(71) Applicant: Alexander B. Mensh, Greenacres, FL (US)

(72) Inventor: Alexander B. Mensh, Greenacres, FL (US)

( * ) Notice: Subject to any disclaimer, the term of this patent is extended or adjusted under 35 U.S.C. 154(b) by 13 days.

(21) Appl. No.: 15/726,969

(22) Filed: Oct. 6, 2017

Related U.S. Application Data

(60) Provisional application No. 62/433,580, filed on Dec. 13, 2016.

(51) Int. Cl.
| | | |
|---|---|---|
| G11B 27/11 | (2006.01) | |
| H04N 21/81 | (2011.01) | |
| H04N 21/414 | (2011.01) | |
| H04N 21/433 | (2011.01) | |
| G06F 3/0488 | (2013.01) | |

(52) U.S. Cl.
CPC ....... *H04N 21/8133* (2013.01); *G06F 3/0488* (2013.01); *G11B 27/11* (2013.01); *H04N 21/41407* (2013.01); *H04N 21/4334* (2013.01)

(58) Field of Classification Search
None
See application file for complete search history.

(56) References Cited

U.S. PATENT DOCUMENTS

| | | | |
|---|---|---|---|
| 2016/0378811 A1* | 12/2016 | Kapoor | G06F 17/30339 707/741 |
| 2017/0034578 A1* | 2/2017 | Patel | H04N 21/454 |
| 2018/0091728 A1* | 3/2018 | Brown | G06F 3/0485 |

* cited by examiner

*Primary Examiner* — Eileen M Adams
(74) *Attorney, Agent, or Firm* — Suiter Swantz pc llo

(57) ABSTRACT

A system for timing an event utilizing video playback on a mobile device is disclosed. The mobile device includes a processor, a touch panel, and a camera. The mobile device is configured to: generate a video recording of an event with the camera; store the video recording of the event in the memory; play back the video recording of the event, frame by frame, via the touch panel; receive a first input via the touch panel, the first input associated with placing a start pin at a first frame or sub-frame of the video recording; receive a second input via the touch panel, the second input associated with placing a finish pin at a second frame or sub-frame of the video recording; and determine a time period between the first frame or sub-frame associated with the start pin and the second frame or sub-frame associated with the finish pin.

20 Claims, 16 Drawing Sheets

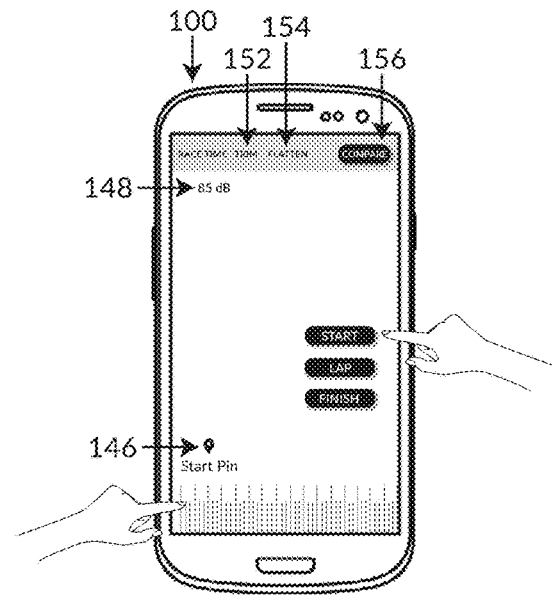
FIG. 6A
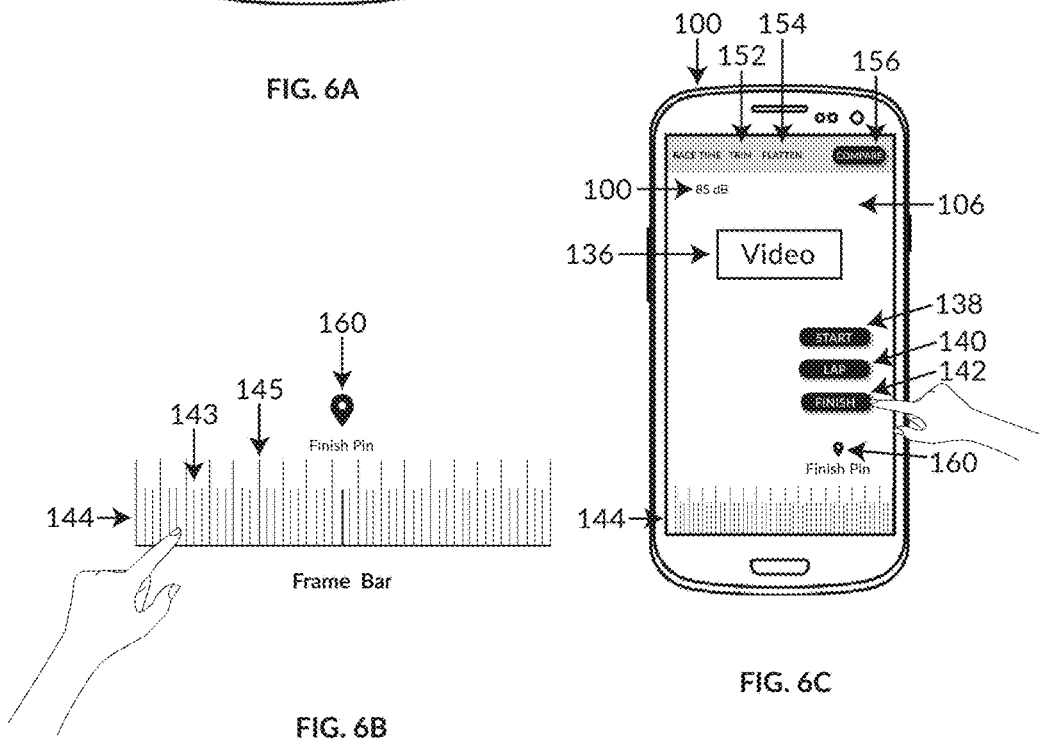
FIG. 6B
FIG. 6C

SYSTEM AND METHOD FOR TIMING EVENTS UTILIZING VIDEO PLAYBACK ON A MOBILE DEVICE

CROSS-REFERENCE TO RELATED APPLICATIONS

The present application claims the benefit under 35 U.S.C. § 119(e) of U.S. Provisional Application Ser. No. 62/433,580, filed Dec. 13, 2016, and titled "SYSTEM AND METHOD FOR TIMING EVENTS UTILIZING VIDEO PLAYBACK ON A MOBILE DEVICE," which is incorporated herein by reference in its entirety.

BACKGROUND

Various timing systems are available to consumers, for example, basic stop watches up to advanced video/laser timing systems with varying degrees of accuracy. A disadvantage of the portable stop watch is its lack of accuracy and inability to review and prove the time of the event by reviewing in video footage. A disadvantage of more advanced video/laser timing systems is cost and lack of portability. For example, video/laser timing systems typically include lasers and/or cameras that need to be set up and fed into a personal computer, or the like. There is a need for a robust, convenient and easy to use system for automatically recording, compiling and storing data that accurately and empirically depicts an event (e.g., an athletic and/or vehicular racing event, or any other timed event for a participant/vehicle or group of participants/vehicles).

SUMMARY

The following presents a general summary of aspects of the present disclosure. This summary is not intended to limit the scope of the present disclosure in any way, but it simply provides a general overview and context for the more detailed description that follows.

Aspects of this disclosure relate to a system for timing an event utilizing video playback on a mobile device. The system includes a mobile device that has a processor, a touch panel, and a camera. The processor is communicatively coupled to a memory having one or more software modules stored thereon. The one or more software modules are executable by the processor to cause the mobile device to: generate a video recording of an event with the camera; store the video recording of the event in the memory; play back the video recording of the event, frame by frame, via the touch panel; receive a first input via the touch panel, the first input associated with placing a start pin at a first frame or sub-frame of the video recording; receive a second input via the touch panel, the second input associated with placing a finish pin at a second frame or sub-frame of the video recording; and determine a time period between the first frame or sub-frame associated with the start pin and the second frame or sub-frame associated with the finish pin.

Aspects of this disclosure also relate to a method of timing an event utilizing video playback on a mobile device. The method includes: generating a video recording of an event with a camera of a mobile device; storing the video recording of the event in a memory of the mobile device; playing back the video recording of the event, frame by frame, via a touch panel of the mobile device; receiving a first input via the touch panel, the first input associated with placing a start pin at a first frame or sub-frame of the video recording; receiving a second input via the touch panel, the second input associated with placing a finish pin at a second frame or sub-frame of the video recording; and determining a time period between the first frame or sub-frame associated with the start pin and the second frame or sub-frame associated with the finish pin.

Aspects of this disclosure also relate to a non-transitory computer readable medium with one or more software modules (e.g., a mobile device application or "App," such as, but not limited to, an iOS, Android, Windows Mobile application, or the like) stored thereon. The one or more software modules are executable by a processor of a mobile device to cause the mobile device to: generate a video recording of an event with a camera of the mobile device; store the video recording of the event in a memory of the mobile device; play back the video recording of the event, frame by frame, via a touch panel of the mobile device; receive a first input via the touch panel, the first input associated with placing a start pin at a first frame or sub-frame of the video recording; receive a second input via the touch panel, the second input associated with placing a finish pin at a second frame or sub-frame of the video recording; and determine a time period between the first frame or sub-frame associated with the start pin and the second frame or sub-frame associated with the finish pin.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 6A illustrates a graphical user interface presented by a display of a mobile device for a system and method of timing events utilizing video playback, such as the mobile device shown in FIGS. 1A through 1F, in accordance with an example embodiment of this disclosure, wherein a start input is used to place a start pin for a video recording of an event.

FIG. 6B illustrates a zoomed in frame bar of a graphical user interface presented by a display of a mobile device for a system and method of timing events utilizing video playback, such as the mobile device shown in FIGS. 1A through 1F, in accordance with an example embodiment of this disclosure, wherein a finish input is utilized to place a finish pin for a video recording of an event, wherein the finish pin is placed at a sub-frame of the frame bar.

FIG. 6C illustrates a graphical user interface presented by a display of a mobile device for a system and method of timing events utilizing video playback, such as the mobile device shown in FIGS. 1A through 1F, wherein a finish input is utilized to place a finish pin for a video recording of an event, wherein the finish pin is placed at a sub-frame of a frame bar of the graphical user interface presented by the display.

DETAILED DESCRIPTION

Overview

Figure 1A:
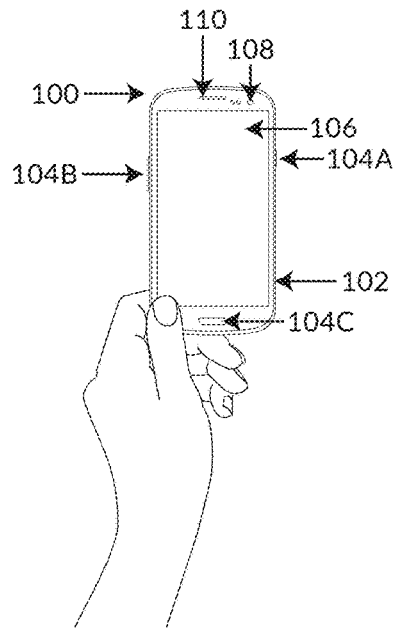
FIG. 1A illustrates a mobile device for a system and method of timing events utilizing video playback, in accordance with an example embodiment of this disclosure, wherein the mobile device is held in a portrait orientation.

The present disclosure relates to systems and methods for timing events using video playback on a mobile device (e.g., Android, iOS (Apple), or Windows Mobile devices, such as, but not limited to, mobile phones, tablets, notebook computers, wearables (e.g., smart watches, activity trackers, etc.), and the like. Such systems and methods may be employed to evaluate athletic performance, physical performance, or timing/speed in general for various activities such as running, swimming, bicycle racing, Boy Scout derby car racing, rodeo, motor vehicle (e.g., dirt bike, racecar, etc.) racing, and the like. The systems and methods may be used by an individual as a measuring stick and motivation to improve performance, and/or by observers, such as, but not limited to, general observers, coaches, trainers, judges, analysts, and so forth.

A time measurement system and an associated method are disclosed. The system and method disclosed herein can provide quick, easy and accurate collection of event timing related data without the need for specialized detection devices (e.g., laser devices) or the like. The system can accurately measure timed events. The system can be implemented in a mobile device, enabling the system to be very portable and affordable, while being able to accurately record, compile, store data, and share proof of a participant's effort. In use, the system can provide motivation for a participant by enabling the participant to set performance goals/challenges or comparing the participant's performance to others participating in the same event.

Some examples of timing systems include laser based sensor systems, radio frequency based sensor systems, global positioning satellite based sensor systems, magnet based sensor systems, magnetic coil based sensor systems, pressure sensor systems, where at least a portion of the sensor system is either worn and/or attached to the start, lap and finish points in the event. Such timing systems rely on more elaborate pre-event setup and are generally less portable than the system disclosed herein. The system and method described herein can offer a high degree of accuracy while also achieving a high degree of portability with little or no setup. Results can be stored directly in video files for an event that can easily be shared as proof of time leaving little doubt when accuracy may be in question.

The present disclosure also relates to systems and methods for comparing stored video timed events with other video timed events stored on the mobile device as well as uploading to a web server to compare with others that have similar timed events. The system can use one or more software modules that implement functionality described herein to record an event either through a single point of view (e.g., a single camera) or it may include a second and/or third camera that will be synchronized to capture multiple views of the timed event. For example, the one or more software modules can be implemented in an application (e.g., an iOS, Android, Windows Mobile application, or the like) that can be installed on a mobile device, whereby a processor of the mobile device is configured to execute the one or more software modules.

Once video is captured, it can be played back (e.g., via the mobile device), frame by frame, to determine which frame the start of the event occurred, mark the frame for the start of the timer, each frame where a lap time occurred, mark the time where each lap time occurred and each frame where a finish occurred. The final frame of the event will be marked and time data for the event will be calculated, exported and stored to a data sheet for comparison, tracking, motivation, etc.

"Race timing" (which may refer to event timing in general) can be tracked by frame by frame video playback (e.g., via the mobile device). The start time can be marked and stored. One or more participants can be viewed frame by frame crossing the finish point and marked. The total time from start to finish can be calculated for each of the one or more participants from the starting point to the finish point. The time can be marked on a frame bar provided via a display (e.g., touch panel or non-touch display of the mobile device), exported and stored to a data sheet (or other data structure). The data can be used for comparison, tracking, personal motivation, and so forth.

Example Implementations

FIGS. 1A through 1F illustrate an embodiment of a mobile device 100 for a system and method of timing events utilizing video playback. The mobile device 100 includes a body 102 (e.g., an enclosure or shell) configured to support a display 106, one or more input devices 104A, 104B, and/or 104C (e.g., buttons, touch/force sensors, proximity sensors, light detectors, audio sensors, or the like). In embodiments, the one or more input devices 104A, 104B, and/or 104C may be programmable to provide multiple functionalities or different functionalities than the default functionalities (e.g., power (on/off), volume (up/down), home/menu) of the one or more input devices. The mobile device 100 device 100 can further include one or more cameras (e.g., front facing camera 108 (e.g., the camera 108 shown in FIGS. 1A through 1D) and/or rear facing camera 112 (e.g., the camera 112 shown in FIG. 1E)), speakers 110, microphone 111, and so forth.

Figure 1B:
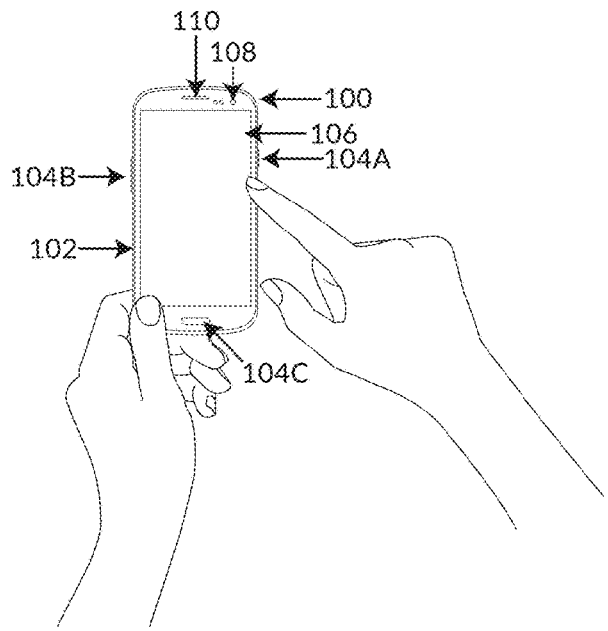
FIG. 1B illustrates a mobile device for a system and method of timing events utilizing video playback, in accordance with an example embodiment of this disclosure, wherein the mobile device is held in a portrait orientation and operated by a finger or a stylus.
Figure 1C:
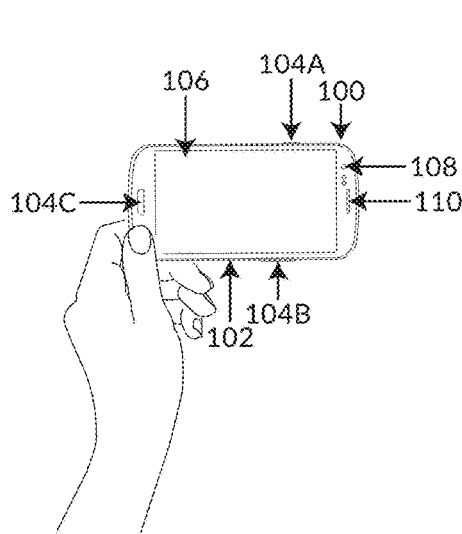
FIG. 1C illustrates a mobile device for a system and method of timing events utilizing video playback, in accordance with an example embodiment of this disclosure, wherein the mobile device is held in a landscape orientation.
Figure 1D:
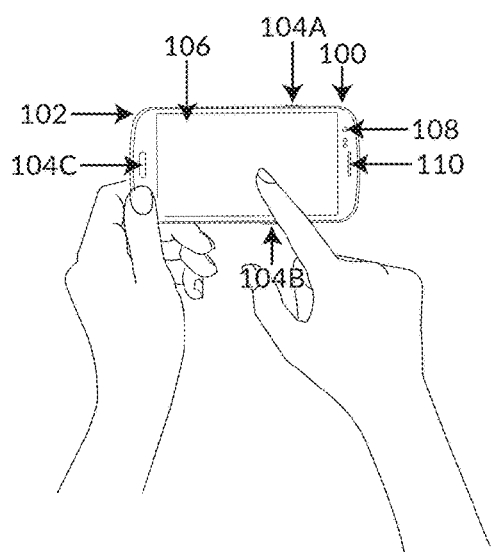
FIG. 1D illustrates a mobile device for a system and method of timing events utilizing video playback, in accordance with an example embodiment of this disclosure, wherein the mobile device is held in a landscape orientation and operated by a finger or a stylus.
Figure 1E:
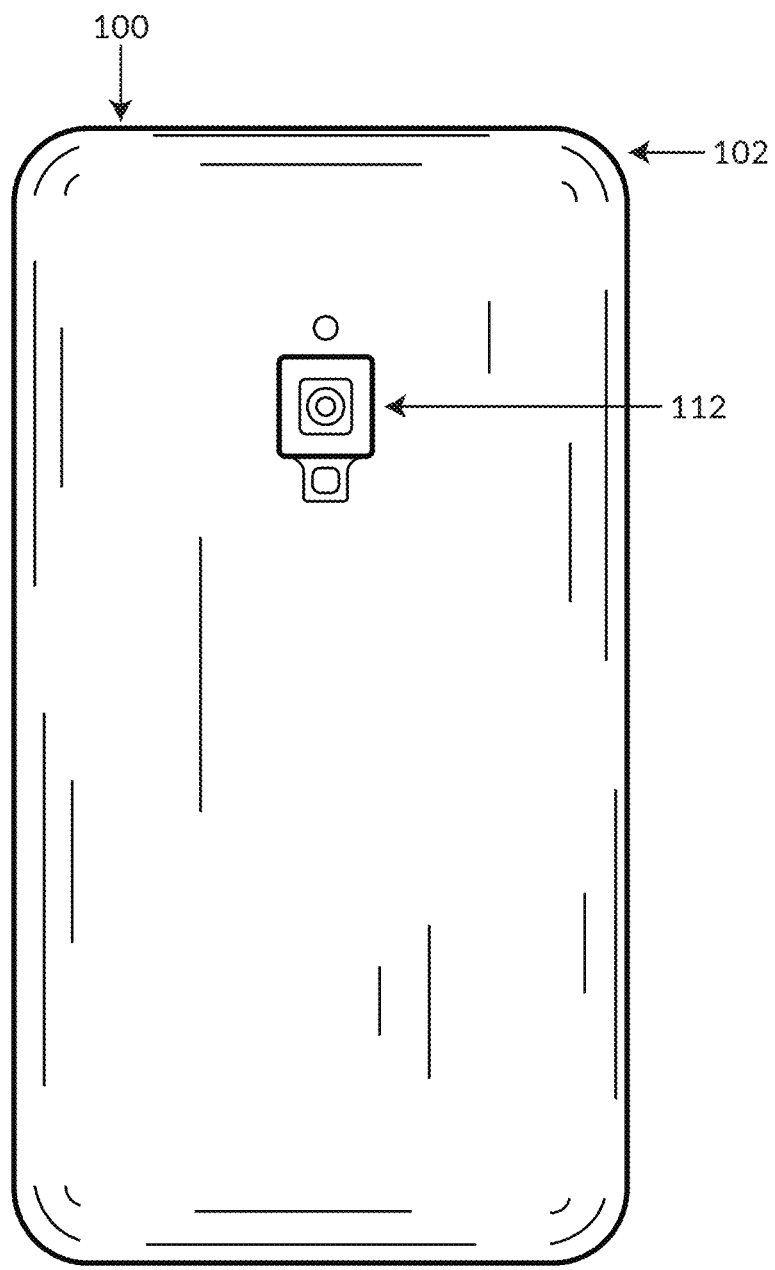
FIG. 1E illustrates a rear view of a mobile device for a system and method of timing events utilizing video playback, such as the mobile device shown in FIGS. 1A through 1D, in accordance with an example embodiment of this disclosure.

FIGS. 1A through 1D demonstrate how an individual can record video and interact with the mobile device 100. A user can hold the mobile device 100 vertically or horizontally to capture video, or to utilize functions (e.g., services) provided via the mobile device 100. For example, the user can hold the mobile device 100 vertically (e.g., as shown in FIG. 1A) or horizontally (e.g., as shown in FIG. 1B) to first record video of an event (e.g., an athletic and/or vehicular racing event, or any other timed event for a participant/vehicle or group of participants/vehicles). After recording video, the user can then interact with the various screens (e.g., the display screens shown in FIGS. 2 through 8) to perform various functions or access information, services, etc., either vertically (e.g., as shown in FIG. 1C) or horizontally (e.g., as shown in FIG. 1D).

Figure 1F:
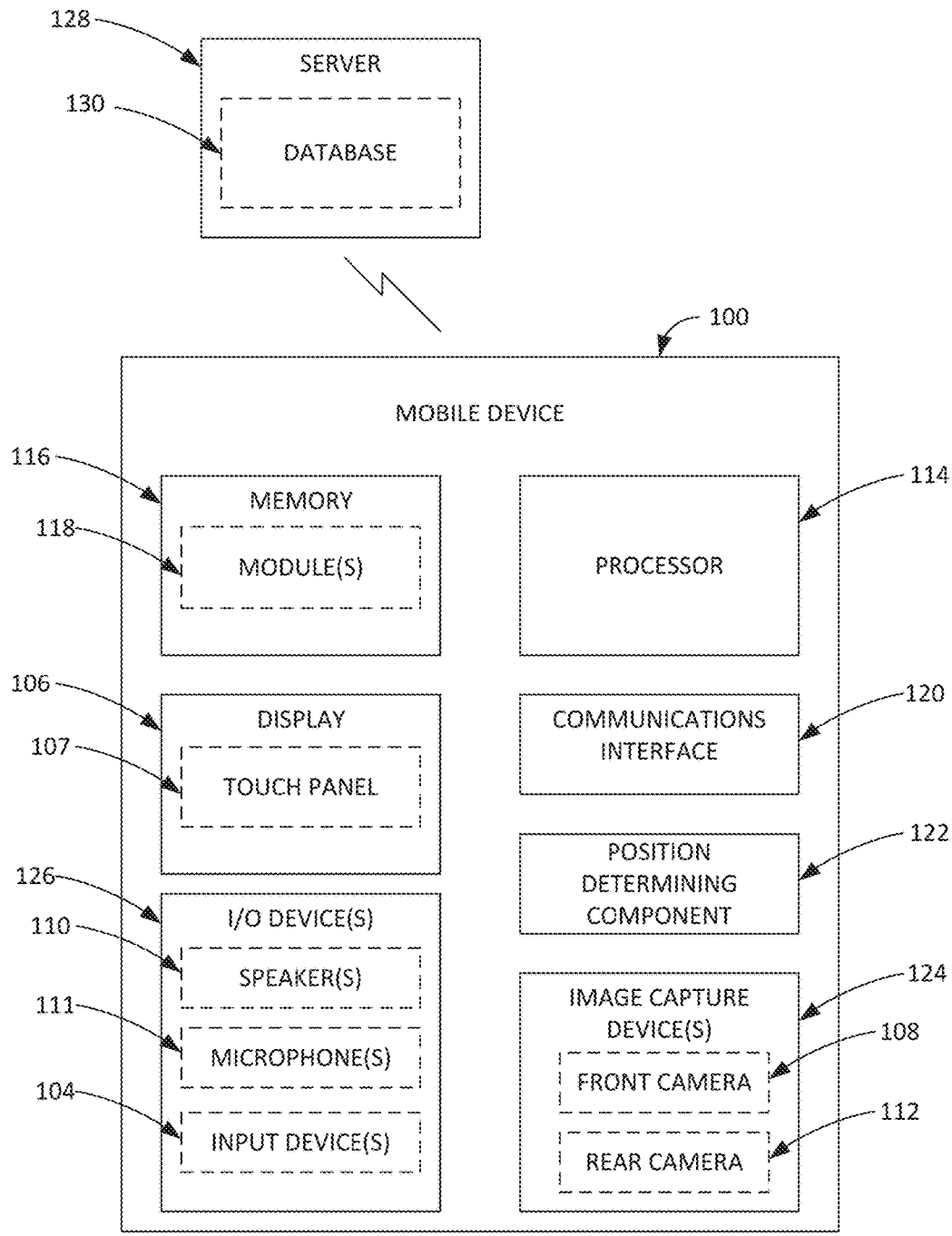
FIG. 1F is a block diagram illustrating a mobile device for a system and method of timing events utilizing video playback, such as the mobile device shown in FIGS. 1A through 1E, in accordance with an example embodiment of this disclosure.

As shown in FIG. 1F, the mobile device 100 includes a processor 114, a memory 116, and a communications interface 120. The processor 114 provides processing functionality for the mobile device 100 (or components thereof) and can include any number of microprocessors, digital signal processors, micro-controllers, circuitry, field programmable gate array (FPGA) or other processing systems, and resident or external memory for storing data, executable code, and other information accessed or generated by the mobile device 100. The processor 114 can execute one or more software programs embodied in a non-transitory computer readable medium that implement techniques described herein. The processor 114 is not limited by the materials from which it is formed or the processing mechanisms employed therein and, as such, can be implemented via semiconductor(s) and/or transistors (e.g., using electronic integrated circuit (IC) components), and so forth.

The memory 116 can be an example of tangible, computer-readable storage medium that provides storage functionality to store various data and/or program code associated with operation of the mobile device 100, such as software programs and/or code segments, or other data to instruct the processor 114, and possibly other components of the mobile device 100, to perform the functionality described herein. Thus, the memory 116 can store data, such as a program of instructions (e.g., software module(s) 118) for operating the mobile device 100 (including its components), and so forth. It should be noted that while a single memory 116 is described, a wide variety of types and combinations of memory (e.g., tangible, non-transitory memory) can be employed. The memory 116 can be integral with the processor 114, can comprise stand-alone memory, or can be a combination of both.

Some examples of the memory 116 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the mobile device 100 and/or the memory 116 can include removable integrated circuit card (ICC) memory, such as memory provided by a subscriber identity module (SIM) card, a universal subscriber identity module (USIM) card, a universal integrated circuit card (UICC), and so on.

The communications interface 120 can be operatively configured to communicate with components of the mobile device 100. For example, the communications interface 120 can be configured to retrieve data from storage in the mobile device 100, transmit data for storage in the mobile device 100, and so forth. The communications interface 120 can also be communicatively coupled with the processor 114 to facilitate data transfer between components of the mobile device 100 and the processor 114. It should be noted that while the communications interface 120 is described as a component of a mobile device 100, one or more components of the communications interface 120 can be implemented as external components communicatively coupled to the mobile device 100 via a wired and/or wireless connection. The mobile device 100 can also be configured to connect to one or more input/output (I/O) devices 126 (e.g., speaker(s) 110, microphone(s) 111, input device(s) 104, and so forth) via the communications interface 120 and/or via direct or indirect communicative coupling with the processor 114. In an embodiment shown in FIG. 1F, the mobile device 100 can include and/or can be communicatively coupled to a touch panel 107 (e.g., display 106 may comprise a touch panel 107), speaker(s) 110, microphone(s) 111, input device(s) 104, image capture device(s) 124 (e.g., front-facing camera 108 and/or rear-facing camera 112), a position determining component 122 (e.g., global positioning system (GPS), global navigation satellite system (GNSS), inertial sensor(s), WIFI/Bluetooth/cell tower triangulation system, etc.), any combination thereof, and the like.

The communications interface 120 and/or the processor 114 can be configured to communicate with a variety of different networks, such as near-field communication (NFC) networks, a wide-area cellular telephone network, such as a cellular network, a 3G cellular network, a 4G cellular network, or a global system for mobile communications (GSM) network; a wireless computer communications network, such as a WiFi network (e.g., a wireless local area network (WLAN) operated using IEEE 802.11 network standards); an ad-hoc wireless network, an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 120 can be configured to communicate with a single network or multiple networks across different access points. In an embodiment, a communications interface 120 can transmit information from the mobile device 100 to an external device (e.g., mobile device, a computer connected to a network, cloud storage, server, etc.). For example, the communications interface 120 may be configured to transmit information from the mobile device 100 to a server 128 having a database 130 for storing and/or updating information based on the information transmitted by the mobile device 100. In another embodiment, a communications interface 120 can receive information from an external device (e.g., a mobile device, a computer connected to a network, cloud computing/storage network, etc.). For example, the communication interface 120 may be further configured to receive information from the server 128 (e.g., database 130 information) so that the information can be presented to a user via the display 106 of the mobile device 100.

The display 106 may be implemented using a liquid crystal display (LCD), a light-emitting diode (LED) display, an organic light emitting diode (OLED) display, or the like. In some embodiments, the display 106 includes a touch panel 107. The touch panel 107 may comprise, but is not limited to: a capacitive touch panel, a resistive touch panel, an infrared touch panel, combinations thereof, and the like. Thus, the display 106 may be configured to receive input from a user and display information to the user of the mobile device 100. For example, the display 106 displays visual output to the user. The visual output may include graphics, text, icons, video, interactive fields configured to receive input from a user, and any combination thereof (collectively termed "graphics"). In some embodiments, some or all of the visual output may correspond to user-interface objects, further details of which are described below. The touch panel 107 is configured to detect a point of contact (or points of contact), as well as any movement or breaking of the contact, on the touch panel 107 and converts the detected contact (e.g., a finger of the user, a stylus, etc.) into electrical signals representing interactions with user-interface objects (e.g., buttons, custom views, icons, web pages, images, web page links, etc.) that are displayed through the display 106. The display 106 can provide a user interface with functionality to allow the user to interact with one or more applications (e.g., implemented by software module(s)) stored on (e.g., in the memory 116 of) the mobile device 100 by providing inputs via the touch panel 107 and/or the I/O devices 126. For example, the user interface may cause an application programming interface (API) to be generated to expose functionality to an application to configure the application for display by the display 106 or in combination with another display. In embodiments, the API may further expose functionality to configure the application to allow the user to interact with an application by providing inputs via the touch panel 107 and/or the I/O devices 126.

Applications (e.g., software subroutines configured for performing specific tasks, etc.) may comprise software module(s) 118 that are storable in memory 116 and executable by the processor 114, to perform a specific operation or group of operations to furnish functionality to the mobile device 100. Example applications may include calendar applications, cellular telephone applications, instant messaging applications, email applications, photograph sharing applications, Internet browsing applications address book applications, and so forth. The software module(s) 118 are configured to implement a mobile application (sometimes referred to as an "app") for timing events utilizing video playback on a mobile device (e.g., mobile device 100). In this regard, any configuration and/or functionality of the mobile device 100/processor 114 described herein can be implemented by the software module(s) 118, where the software module(s) include program instructions that cause the processor 114 to perform specific operations or functions when the software module(s) 118 are executed by the processor 114. Example embodiments of the mobile application implemented by software module(s) 118 are illustrated in FIGS. 2 through 8 and are further described below. The mobile application can include, but is not limited to, Android application, iOS application, Windows Mobile application, or the like.

Figure 2:
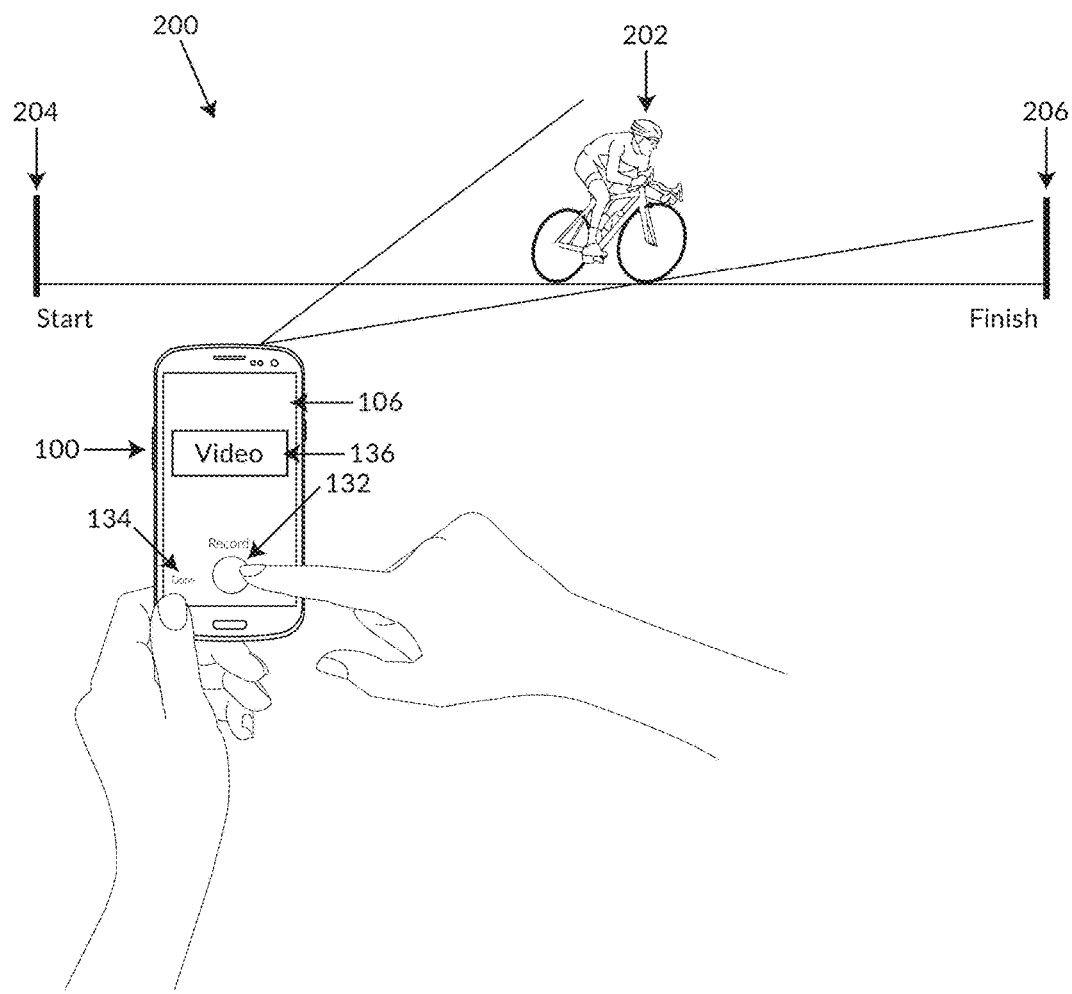
FIG. 2 illustrates a video capture event with a mobile device for a system and method of timing events utilizing video playback, such as the mobile device shown in FIGS. 1A through 1F, in accordance with an example embodiment of this disclosure.

FIG. 2 illustrates an example implementation of the mobile application, wherein the mobile device 100 is configured to generate a video recording 136 of an event 200. For example, the processor 114 can be configured to cause the display 106 to present a screen with a record input/button 132 for recording the event 200 and a done input/button 134 for completing the recording of the event 200. In some embodiments, the record input/button 132 and the done input/button are the same, or they can be separate inputs/buttons (e.g., as shown in FIG. 2). A user may capture the video recording 136 of another individual 202 who is a participant in the event 200. For example, the event 200 may be a timed event having a starting point 204 and an end point 206, and/or a number of intermediate points (e.g., laps), and so forth. To begin capturing the video, the user selects the record input/button 132. After selecting the record input/button 132, the user follows the other individual 202 with the image capture device (e.g., camera 108 and/or 112) of the mobile device 100 as they participate in the event 200. The user can select the done input/button 134 to stop recording the event 200. The processor 114 is configured to store the video recording 136 in the memory 116 (e.g., in the mobile application's saved videos) after the done input/button 134 is selected. The video recording 100 can include a video recording of a single individual 202 or a plurality of individuals 202 participating in an event 200 (e.g., a training event, race, one person timed event, etc.).

Figure 3A:
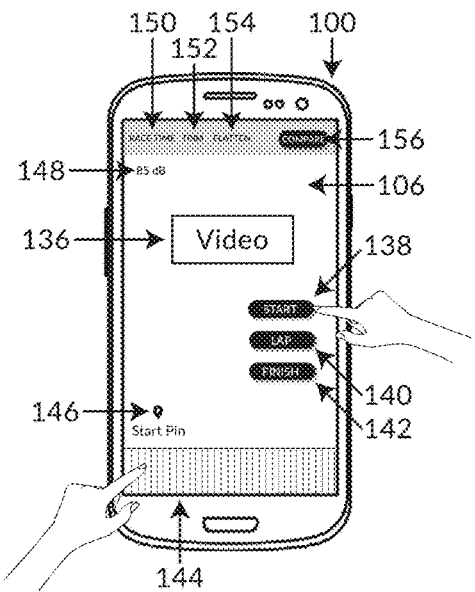
FIG. 3A illustrates a graphical user interface presented by a display of a mobile device for a system and method of timing events utilizing video playback, such as the mobile device shown in FIGS. 1A through 1F, in accordance with an example embodiment of this disclosure, wherein a start input is used to place a start pin for a video recording of an event.
Figure 3B:
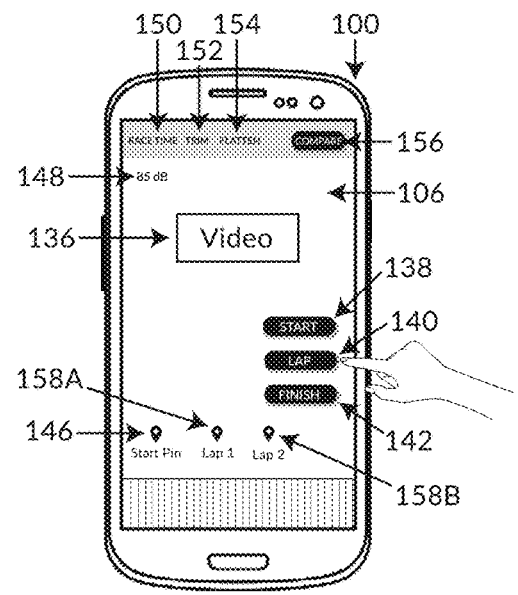
FIG. 3B illustrates a graphical user interface presented by a display of a mobile device for a system and method of timing events utilizing video playback, such as the mobile device shown in FIGS. 1A through 1F, in accordance with an example embodiment of this disclosure, wherein a lap input is utilized to place a lap pin for a video recording of an event.
Figure 3C:
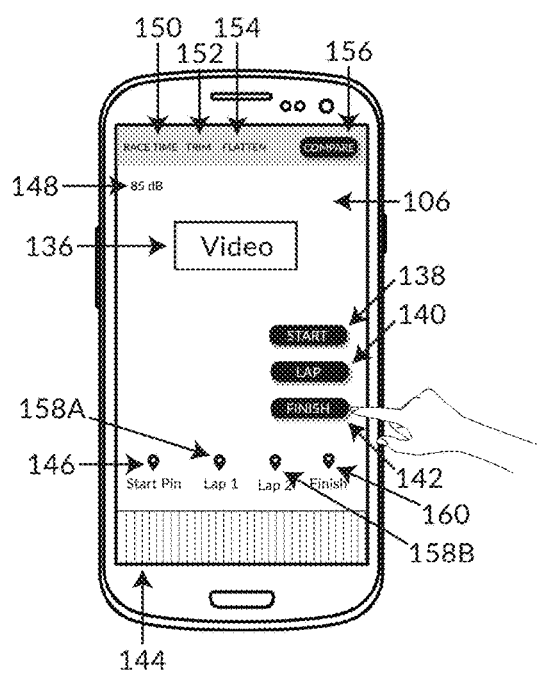
FIG. 3C illustrates a graphical user interface presented by a display of a mobile device for a system and method of timing events utilizing video playback, such as the mobile device shown in FIGS. 1A through 1F, in accordance with an example embodiment of this disclosure, wherein a finish input is utilized to place a finish pin for a video recording of an event.

FIGS. 3A through 3C illustrate example implementations of the mobile application, wherein the mobile device 100 is configured to playback the video recording 136 of the event 200 via the display 106 and provide various selections for the user to perform operations associated with event timing utilizing the video recording 136. For example, the mobile device 100 can be configured to display a playback screen after the user finishes recording the event 200. In some embodiments, mobile device 100 is configured to provide access to the video recording 136 in response to an input associated with accessing one or more saved videos. The mobile device 100 is configured to playback the video recording 136, frame by frame, via the display 106. While the video recording 136 is presented via the display 106, the mobile device 100 is further configured to present a frame bar 144 with a plurality of frame and/or sub-frame indicators (e.g., frame indicators 145 and sub-frame indicators 143). The mobile device 100 is configured to receive user inputs associated with placing pins (e.g., fiducial markers of any kind) for various reference points (e.g., a start pin 146, lap pin(s) (e.g., lap pins 158A and 158B), a finish pin 160, and so forth). In an embodiment, the mobile device 100 is configured to provide, via the display 106, various inputs/buttons (e.g., a start input/button 138, a lap input/button 140, a finish input/button 142, etc.) associated with reference points of a timed event. The mobile device 100 is then configured to detect user interactions with the various inputs/buttons.

As shown in FIG. 3A, when the start input/button 138 is selected, the processor 114 is configured to receive an input associated with placing a start pin 146 at a frame or sub-frame of the video recording 136. The processor 114 can be configured to cause the display 106 to show a visual representation of the start pin 146 in proximity to (e.g., at or near) a frame or sub-frame indicator of the frame bar 144.

As shown in FIG. 3B, when the lap input/button 140 is selected, the processor 114 is configured to receive an input associated with placing at least one pin (e.g., lap pin 158A and/or lap pin 158B) at another frame or sub-frame of the video recording 136. The processor 114 can be configured to cause the display 106 to show a visual representation of each lap pin (e.g., lap pin 158A and/or lap pin 158B) in proximity to (e.g., at or near) a respective frame or sub-frame indicator of the frame bar 144. If an event includes multiple laps, the lap input/button 140 allows the user to track the exact lap time of each lap a participant (e.g., individual 202) completes throughout the timed event. Each time the individual 202 completes a lap, the user can select the lap input/button 140 to place a lap pin (e.g., lap pin 158A, lap pin 158B, and so forth) along the frame bar 144. In practice, the user can review the video recording 136 played back via the display 106 of the mobile device 100 by scrolling through the video recording 136 and selecting the lap input/button 140 after each lap. The processor 114 can be configured to determine (e.g., calculate) a time period between the frame or sub-frame associated with the start pin 146 and the frame or sub-frame associated with a lap pin (e.g., lap pin 158A or 158B). The processor 114 can also be configured to determine a time period between the frame or sub-frame associated with a first lap pin 158A and the frame or sub-frame associated with a second lap pin 158B, and so forth. The processor 114 can be configured to store the lap times in memory 116 (e.g., in a data file, such as the data sheet 188 shown in FIG. 8) for further use and/or analysis.

In yet another example, shown in FIG. 3C, when the finish input/button 142 is selected, the processor 114 is configured to receive an input associated with placing a finish pin 160 at a frame or sub-frame of the video recording 136. The processor 114 can be configured to cause the display 106 to show a visual representation of the finish pin 160 in proximity to (e.g., at or near) a frame or sub-frame indicator of the frame bar 144. In practice, the user can review the video recording 136 played back via the display 106 of the mobile device 100 by scrolling through the video recording 136 and selecting the finish input/button 142 at the exact frame or sub-frame where the participant completes the event 200 (e.g., where the individual 202 crosses the finish line 206). The processor 114 can be configured to determine (e.g., calculate) a time period between the frame or sub-frame associated with the start pin 146 and the frame or sub-frame associated with the finish pin 160. The processor 114 can also be configured to determine a time period between the frame or sub-frame associated with a lap pin (e.g., lap pin 158B) and the frame or sub-frame associated with the finish pin 160 (e.g., to determine a time period associated with a final lap). The processor 114 can be configured to store the lap times in memory 116 (e.g., in a data file, such as the data sheet 188 shown in FIG. 8) for further use and/or analysis.

In the manner described above, the mobile application allows the user to place pins at the exact frames of the video recording 136 that designate the start, (optional) lap, and finish times of timed events. This provides for a convenient and accurate methodology to track timed athletic performances and other timed events where precise timing is critical. To aid in the video playback and pin placement process, the mobile device 100 may be further configured to scroll through (e.g., by advancing or rewinding) the video recording 136, frame-by-frame, in response to a left or right swipe movement along any portion of the frame bar 144. In this regard, the user can use the frame bar 144 to quickly move along the video recording 136 to more easily find the starting point, lap times, and finish time of the event 200.

In some embodiments, the mobile device 100 is further configured to provide a sound level indicator 148 via the display 106 to assist with time tracking. For example, the sound level indicator 148 can assist with identification of a start time or stop time for the event 200. As shown in FIGS. 3A through 3C, the mobile device 100 can be configured to display the sound level indicator 148 as a measurement (e.g., in decibels (dB)). Decibels are units that measure the intensity of a sound. When the video recording 136 is played back, frame by frame, a spike in the measured sound level can help identify the start or end of a timed event which may correspond to the sound of a starter gun, horn, bell, buzzer, megaphone, or the like. The sound level indicator 148 allows the user to gauge the sound level of certain noises occurring at frames of the video recording 136 and aids in identifying the exact start time, and possibly end time, of the event 200.

As further shown in FIGS. 3A through 3C, the mobile device 100 can be configured to display inputs/buttons associated with race timing operations (e.g., race time input/button 150), video trimming operations (e.g., trim input/button 152), and video flattening operations (e.g., flatten input/button 154). In response to receiving an input associated with user selection of the race time input/button 150, the processor 114 can be configured to present, via display 106, a screen that enables the user to place multiple finish pins for an event having multiple participants (as is further described below with reference to FIGS. 4A through 4C). In response to receiving an input associated with user selection of the trim input/button 152, the processor 114 can be configured trim the video recording 136 to generate a trimmed video recording that is shorter in duration than the original video recording. For example, the processor 114 can be configured to shorten the duration of the video recording 136 by removing video frames occurring prior to a video frame or sub-frame associated with the start pin 146 and removing video frames occurring after a video frame or sub-frame associated with the finish pin 160. In response to receiving an input associated with user selection of the flatten input/button 154, the processor 114 can be configured flatten the video recording 136 to generate a flattened video recording having a reduced file size in comparison to the original video recording. For example, the processor 114 can be configured to flatten (e.g., digitally filter and/or compress) the video recording 136 based on a flattening algorithm to allow for cleaner and faster uploading and downloading to and from the internet (e.g., to or from server 128).

Figure 4A:
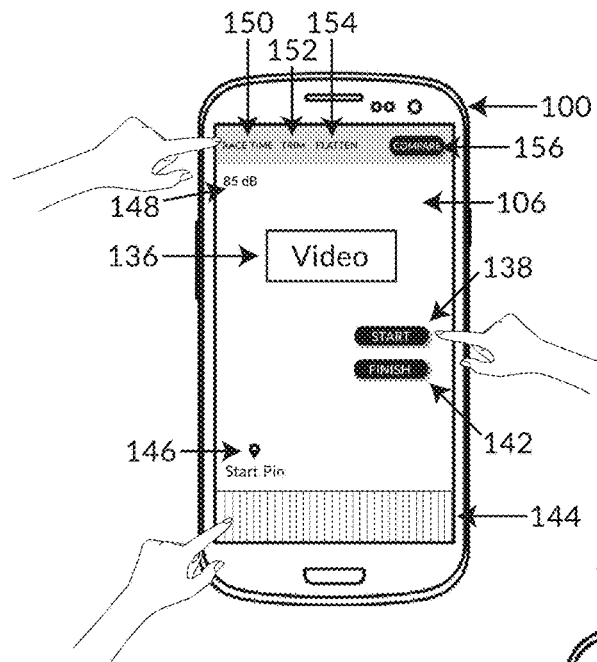
FIG. 4A illustrates a graphical user interface presented by a display of a mobile device for a system and method of timing events utilizing video playback, such as the mobile device shown in FIGS. 1A through 1F, in accordance with an example embodiment of this disclosure, wherein a start input is used to place a start pin for a video recording of an event.
Figure 4B:
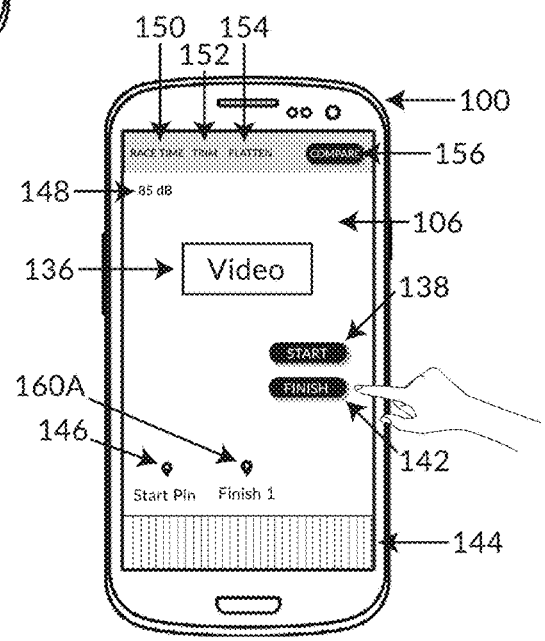
FIG. 4B illustrates a graphical user interface presented by a display of a mobile device for a system and method of timing events utilizing video playback, such as the mobile device shown in FIGS. 1A through 1F, in accordance with an example embodiment of this disclosure, wherein a finish input is utilized to place a first finish pin for a video recording of an event.
Figure 4C:
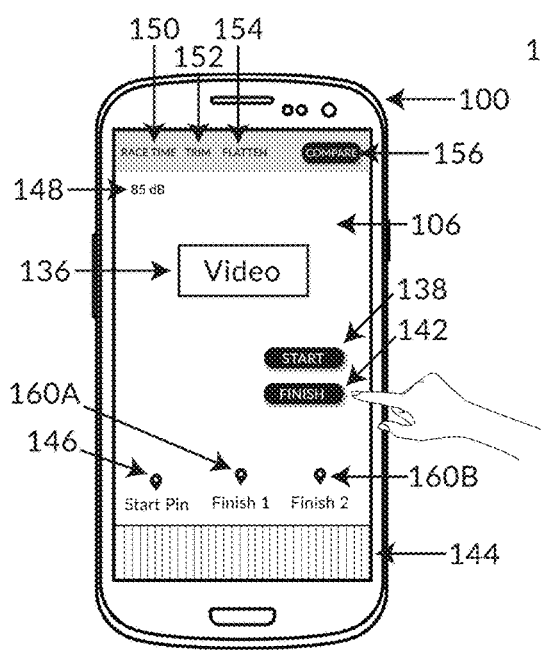
FIG. 4C illustrates a graphical user interface presented by a display of a mobile device for a system and method of timing events utilizing video playback, such as the mobile device shown in FIGS. 1A through 1F, in accordance with an example embodiment of this disclosure, wherein a finish input is utilized to place a second finish pin for a video recording of an event.

In FIGS. 4A through 4C, the mobile application allows users to track times for timed events with multiple participants, referred to in this disclosure as "race timing." For example, as shown in FIG. 4A, mobile device 100 can present a screen adapted for race timing in response to receiving a user selection of the race time input/button 150. Responsive to the user selection of the race time input/button 150, the processor 114 may be configured to accept multiple user inputs associated with finishes (e.g., placement of finish pins with respect to the video recording 136 (e.g., at or near respective frame or sub-frame indicators of the frame bar 144).

As shown in FIG. 4A, when the start input/button 138 is selected, the processor 114 is configured to receive an input associated with placing a start pin 146 at a frame or sub-frame of the video recording 136. The processor 114 can be configured to cause the display 106 to show a visual representation of the start pin 146 in proximity to (e.g., at or near) a frame or sub-frame indicator of the frame bar 144.

As shown in FIG. 4B, when the finish input/button 142 is selected, the processor 114 is configured to receive an input associated with placing a first finish pin 160A at another frame or sub-frame of the video recording 136. The processor 114 can be configured to cause the display 106 to show a visual representation of first finish pin 160A in proximity to (e.g., at or near) a respective frame or sub-frame indicator of the frame bar 144. If the event includes multiple participants and "race timing" is enabled, the finish input/button 142 allows the user to track the exact finish time of each participant (e.g., multiple individuals 202) participating a timed event. For example, as shown in FIG. 4C, when the finish input/button 142 is selected a second time, the processor 114 is configured to receive an input associated with placing a second finish pin 160B at another frame or sub-frame of the video recording 136. The processor 114 can be configured to cause the display 106 to show a visual representation of second finish pin 160B in proximity to (e.g., at or near) a respective frame or sub-frame indicator of the frame bar 144. Each time an individual 202 reaches the finish line 206, the user can select the finish input/button 142 to place a finish pin (e.g., finish pin 160A, finish pin 160B, and so forth) along the frame bar 144. In practice, the user can review the video recording 136 played back via the display 106 of the mobile device 100 by scrolling through the video recording 136 and selecting the finish input/button 142 after each participant completes the event (e.g., each time a different individual 202 passes the finish line 206). The processor 114 can be configured to determine (e.g., calculate) a time period between the frame or sub-frame associated with the start pin 146 and the respective frame or sub-frame associated with each of the finish pins (e.g., finish pins 160A, 160B, etc.). The processor 114 can be further configured to store the finish times for the multiple participants in memory 116 (e.g., in a data file, such as the data sheet 188 shown in FIG. 8) for further use and/or analysis.

Figure 5A:
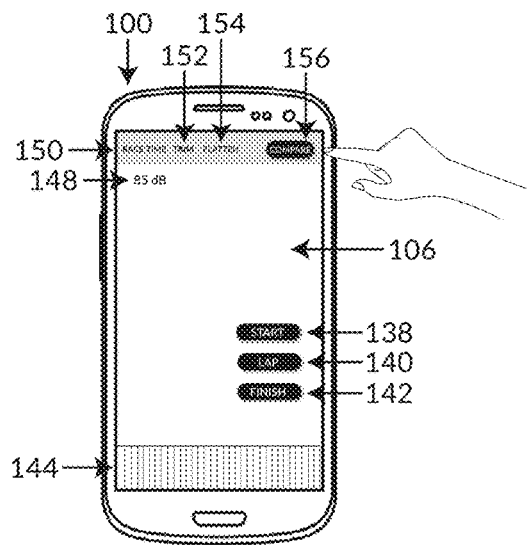
FIG. 5A illustrates a graphical user interface presented by a display of a mobile device for a system and method of timing events utilizing video playback, such as the mobile device shown in FIGS. 1A through 1F, in accordance with an example embodiment of this disclosure, wherein a compare input is utilized to transition to a user interface screen associated with a compare feature for comparing multiple video recordings of an event.
Figure 5B:
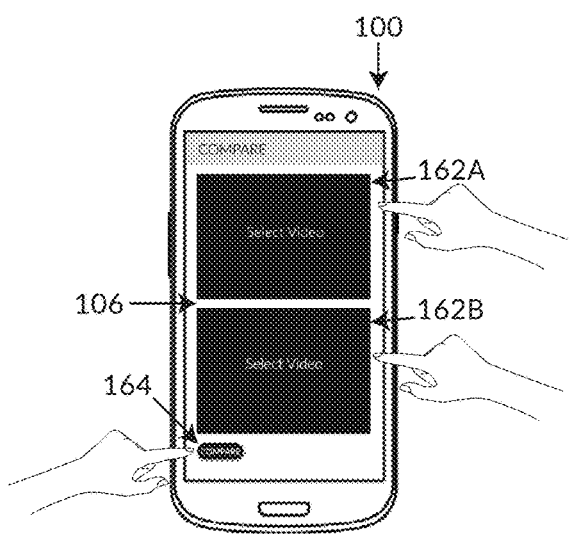
FIG. 5B illustrates a graphical user interface presented by a display of a mobile device for a system and method of timing events utilizing video playback, such as the mobile device shown in FIGS. 1A through 1F, in accordance with an example embodiment of this disclosure, wherein a first video selection input is utilized to select a first video recording of an event, and a second video selection input is utilized to select a second video recording of an event.
Figure 5C:
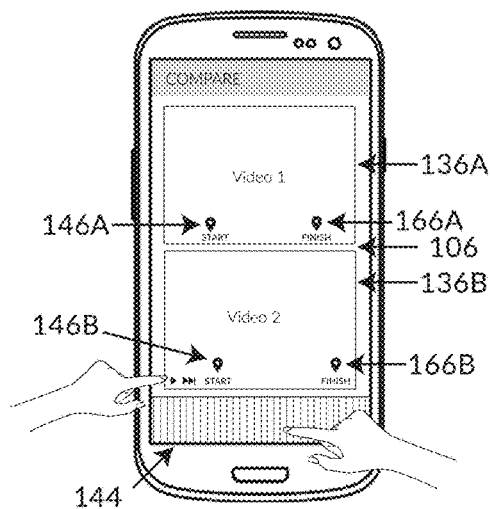
FIG. 5C illustrates a graphical user interface presented by a display of a mobile device for a system and method of timing events utilizing video playback, such as the mobile device shown in FIGS. 1A through 1F, in accordance with an example embodiment of this disclosure, wherein the first video recording of the event and the second video recording of the event are played back simultaneously, including start, lap, and/or finish pins embedded within or otherwise associated with (e.g., overlaid onto) the video recordings.

The mobile application also allows the user to compare two timed events side-by-side. For example, FIGS. 5A through 5C illustrate implementations of the mobile application, where the mobile device 100 is configured to display side-by-side video recordings 136A and 136B simultaneously, for frame-by-frame playback of both video recordings. As shown in FIG. 4A, the processor 114 can be configured to cause the display 106 to present a compare input/button 156 associated with a compare functionality of the mobile application. In response to receiving an input associated with the selection of the compare input/button 156, the processor is configured to present a screen with at least two frames (e.g., video frame 162A and video frame 162B) that prompt the user to select video recordings for comparison.

For example, the mobile device 100 can be used to take a first video recording 136A of a first event and a second video recording 136B of a second event, where the second event may be the same event (e.g., for comparing videos taken by different with different filters, camera angles, with different mobile devices, etc.), or the second event may be different from the first event (e.g., to compare a participant's performance in different races or other timed events). In the manner described above, the user can place respective start, (optional) lap, and finish pins (e.g., start pins 146A and 146B, finish pins 166A and 166B, etc.) at respective video frames or sub-frames of the video recordings 136A and 136B. The processor 114 is configured to store the video recordings 136A and 136B, with their respective pins, in the memory 116.

In the screen shown in FIG. 5B, the user can select the first video recording 136A after entering a first select video input 162A and can select the second video recording 136B after entering a second select video input 162B. For example, after receiving a user selection associated with the first select video input 162A, the mobile device 100 is configured to display a list of stored video recordings (e.g., including the first video recording 136A and the second video recording 136B). After receiving a user selection associated with a video recording (e.g., the first video recording 136A), the mobile device 100 is configured to display the select video screen shown in FIG. 5B again. Then after receiving a user selection associated with the second select video input 162B, the mobile device 100 is configured to display the list of stored video recordings (e.g., including the first video recording 136A and the second video recording 136B) again. After receiving a user selection associated with another video recording (e.g., the second video recording 136B), the mobile device 100 is configured to display the select video screen shown in FIG. 5B yet again. The mobile device 100 presents a compare button/input 164, and in response to user selection of the compare button/input 164, the mobile device 100 displays the first video recording 136A and the second video recording 136B, via display 106, simultaneously (e.g., side-by-side). The mobile device 100 is configured to play back the videos, frame by frame, in the same manner that a single video is played back (e.g., as described with references to FIGS. 3A through 3C and 4A through 4C). For example, the user can scroll through the videos, individually or simultaneously, by advancing or reversing the frame bar 144. When the two videos (e.g., 136A and 136B) are seen on the video comparison screen, the user can select play (e.g., a triangular play icon 186), to play back the two videos together at the same time. If the user wishes to advance the video faster, slower, or to a certain point in time, the user is also able to scroll across the frame bar 144 to move both videos together, fame-by-frame. Both videos may be compared and linked based on the start point for each video. For example, advancing the first video recording 136A five second from the starting point will automatically advance the second video recording 136B the same amount of time, thereby providing true frame by frame comparison.

FIGS. 6A through 6C shows an embodiment where the mobile application is configured to enable a user to find more accurate timing of fast-paced events, such as when timing high speed bikes or cars. Video recordings can be broken into so many frames per second. When recording a fast moving object, a frame could show the object slightly behind the finish point, while the next frame shows the object slightly across the finish point. This means that there is no actual frame associated with when the object reached the finishing point. Lines that are placed between each full frame, referred to as fractional frames (or sub-frames), help resolve this issue and develop a system to find the most accurate time.

FIG. 6A depicts a user selection associated with placing a start pin 146 along the frame bar 144. The user can then scroll along the frame bar 144 until they reach the point where the individual/object (e.g., individual 202) they are recording reaches the finishing point (e.g., finish line 206). Frame bar indicators (e.g., lines 143 and 145) in the frame bar indicate which frame is being shown. The mobile device 100 may be configured to display highlighting at whichever frame or fractional frame is being shown, helping the user see which frame they are on.

FIG. 6B is a zoomed in view of the frame bar 144 displaying both full frames (e.g., indicated by lines 145) and fractional or sub-frames frames (e.g., indicated by lines 143). Between each full frame are the smaller fractional or sub-frames frames. These sub-frames may break the full frames into halves, thirds, fourths, or virtually any fraction (e.g., 10ths, 100ths, etc.). By doing so, the user is able to find a more accurate finish time.

When selecting a lap or finish time, the user can use the frame bar 144 to scroll along the video recording 136. When scrolling, the current frame or fractional frame will be highlighted. Once the individual/object they are recording reaches the lap point or finishing point, the user can select the lap input/button 140 or the finish input/button 142 (e.g., as shown in FIG. 6C) to place either a lap pin (e.g., 158A, 158B) or finish pin 160 on at closest full frame indicator 145 or sub-frame indicator 143.

Figure 7A:
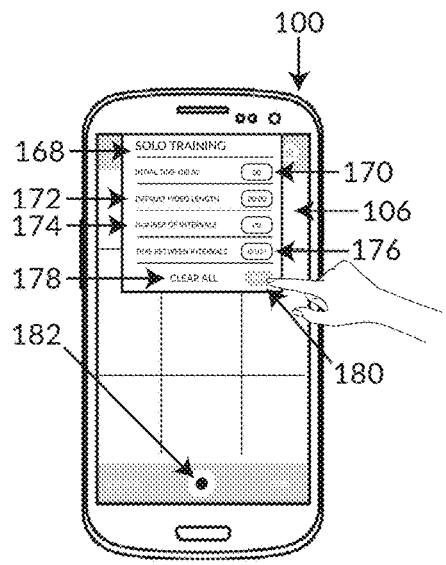
FIG. 7A illustrates a graphical user interface presented by a display of a mobile device for a system and method of timing events utilizing video playback, such as the mobile device shown in FIGS. 1A through 1F, in accordance with an example embodiment of this disclosure, wherein a solo mode is activated for generating a video recording of an event, wherein the video recording is based upon one or more parameters selected by the event participant.
Figure 7B:
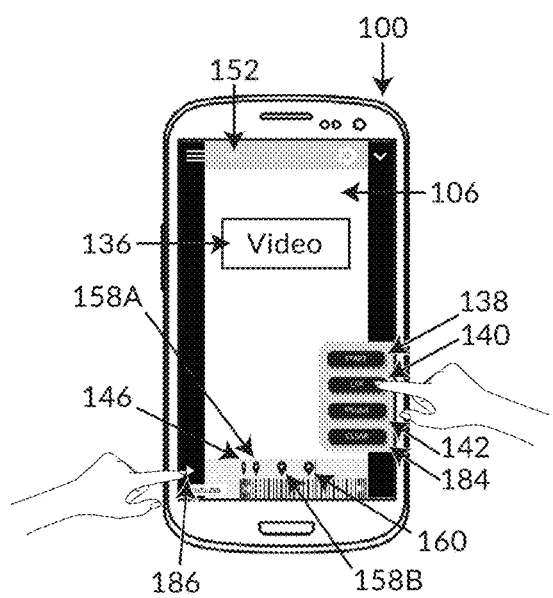
FIG. 7B illustrates a graphical user interface presented by a display of a mobile device for a system and method of timing events utilizing video playback, such as the mobile device shown in FIGS. 1A through 1F, in accordance with an example embodiment of this disclosure, wherein start, lap, and/or finish pins are placed for the video recording of the event recorded in the solo mode.

FIGS. 7A and 7B illustrate an example implementation of a solo training feature of the mobile application. When a user selection for the solo training feature is received, the mobile device 100 is configured to display a solo training menu 168. The solo training menu 168 can include selections including, but not limited to, initial time delay 170 (e.g., allowing the user to enter a delay prior to commencing a video recording of the event), default video length 172 (e.g., allowing the user to enter a default duration for the video recording), number of intervals 174 (e.g., allowing the user to enter a number of video recording intervals), time between intervals 178 (e.g., allowing the user to enter a time between the video recording intervals), a clear all selection 178 (e.g., allowing the user to clear/reset the other solo training selections), and a "go" selection 180 (e.g., allowing the user to begin solo training based on the user-selected video recording rules/specifications). The mobile device 100 is configured begin taking video recording(s) according to the solo training user entries when a record input/button 182 is selected. As shown in FIG. 7B, the mobile device 100 is configured to enable user selection of start, lap, and finish points (e.g., via inputs/buttons 138, 140, and 142) for placement of associated pins (e.g., pins 146, 158A, 158B, 160, etc.) in the same manner described above (e.g., with reference to FIGS. 3A through 3C).

The mobile device 100, in the embodiment shown in FIG. 7B, or in any of the other embodiments (e.g., FIGS. 3A through 6C) can be further configured to provide a clear input/button 184 via the display 106. The processor can be configured to remove all pins (e.g., start pin 146, lap pins 158A and 158B, finish pin 160, etc.) in response to receiving a user selection of the clear input/button 184. In this regard, the user can reset the video recording 136 by clearing out all fiducial markers by selecting the clear input/button 184.

Figure 8:
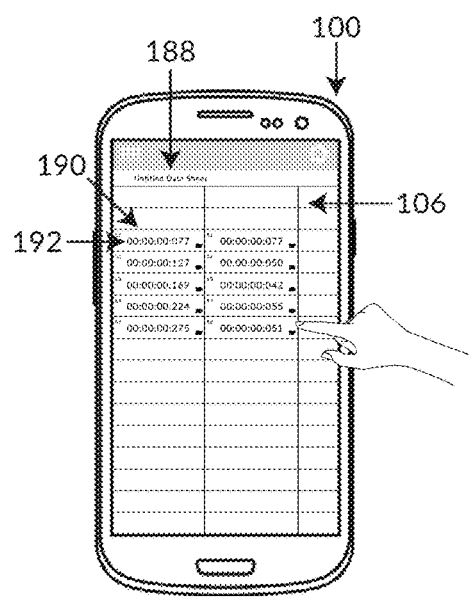
FIG. 8 illustrates a graphical user interface presented by a display of a mobile device for a system and method of timing events utilizing video playback, such as the mobile device shown in FIGS. 1A through 1F, in accordance with an example embodiment of this disclosure, wherein a data sheet screen is displayed, wherein a cell of the data sheet is selected to automatically load an event timing within the cell (and possibly neighboring cells) of the data sheet based upon a video recording of an event and start, lap, and/or finish pins associated with the video recording.

As previously described herein, the even timings can be stored in a data sheet 188 (e.g., as shown in FIG. 8). In an example implementation, the mobile device 100 can be configured to: display a data sheet 188 having a plurality of cells 190; receive a video selection input associated with the video recording of an event (e.g., video recording 136); and in response to receiving the video selection input, display the time period 192 between the frame or sub-frame associated with the start pin 146 and the frame or sub-frame associated with the finish pin in a cell of the spreadsheet 188. In another example implementation, in response to receiving the video selection input, the mobile device 100 is configured to display the time period between first frame or sub-frame associated with the start pin 146 and the intermediate frame or sub-frame associated with the lap pin (e.g., pin 158A) in a cell of the spreadsheet 188, and further display the time period between the frame or sub-frame associated with the start pin 146 and the frame or sub-frame associated with the finish pin 160 in another cell of the spreadsheet 188. In another example implementation, in response to receiving the video selection input, the mobile device 100 is configured to display the time period between the frame or sub-frame associated with the start pin 146 and the frame or sub-frame associated with the finish pin 160A in a cell of the spreadsheet 188, and further display the time period between the frame or sub-frame associated with the start pin 146 and the frame or sub-frame associated with the second finish pin 160B in another cell of the spreadsheet. The foregoing examples are illustrative of the data sheet features of the mobile application, whereby determined (e.g., calculated) event timings for laps, finishes, etc., can be imported into a data sheet 188 (e.g., a spreadsheet) having a plurality of cells 190 for convenient viewing by the user. It is noted that the foregoing examples are not exhaustive and any combination of data entries (e.g., timings) in addition to contextual information (e.g., event descriptions, dates, locations, participant names, etc.) can be stored in the data sheet 188 or any other data structure. Furthermore, in some implementations, the mobile device 100 is further configured (e.g., by way of the communications interface 120) to upload stored data to a remote server 128 (e.g., for storage in a database 130 that is accessible to multiple users having access to the mobile application on respective mobile devices 100), or can similarly download stored data from the remote server 128 to access previously uploaded information or information uploaded by other users (e.g., for timing comparison, performance evaluation, multi-location competitions, and so forth).

The mobile application may further include a variety of additional user interface features. For example, in an implementation, the mobile device 100 may be configured to record video with an on-device camera (e.g., camera 108 and/or camera 112) in addition to a communicatively coupled camera (e.g., a Go Pro) camera that is Bluetooth, WiFi, NFC coupled, or connected by a cable (e.g., USB cable) to the mobile device 100. In this regard, the mobile device 100 can be configured to capture multiple video recordings of an event simultaneously from different vantage points. In another example implementation, the mobile device 100 can be configured to perform statistical analysis to calculate various averages based on time data collected and can be configured to display the results (e.g., as numerical values or as graphical depictions). In another example implementation, the mobile device 100 may be configured to calculate speed and acceleration based on the input of distance points (e.g., distance pins, much like the start, lap, or finish pins described above) for a previously timed event. In another example implementation, the data sheet 188 can include tabs for additional data sheets (e.g., as part of a multi-sheet data structure). In another example implementation, the mobile device 100 can be configured to record voice over narration for a video recording, whereby the voice over narration supplements or replaces the sound component of the video recording. In another example implementation, the mobile device 100 can be configured to export a side-by-side comparison or multi-camera video. For example, the mobile device 100 can be configured to stitch multiple video recordings together into a single video file (e.g., a single MPEG, or the like). In another example implementation, the mobile device 100 can be configured to associated notes with individual video frames or sub-frames (e.g., notes can be associated with the video frames in the same manner as the start, lap, or finish pins described herein). In another example implementation, the mobile device 100 can implement the playback, timing, and/or comparison functionalities described herein with an imported video file (e.g., a video file imported from another application, downloaded from the server 128, transferred from another device (e.g., PC or mobile device), etc.). In another example implementation, the mobile device 100 can be configured to provide pinch zoom functionalities (e.g., to video playback and/or compare video screens), total zoom functionality (e.g., breaks out video to full screen then back in video playback and/or compare videos screens). In another example implementation, the mobile device 100 can be configured to provide loop playback functionalities (e.g., to video playback and/or compare video screens). In another example implementation, the mobile device 100 can be configured to provide sound on/off functionalities (e.g., to video playback and/or compare video screens and/or for video recording). In another example implementation, the mobile device 100 can be configured to provide sound zoom control bar functionalities for video recording. In another example implementation, the mobile device 100 can be configured to display time at lap pins (e.g., pins 158A and 158B), finish pins 160, and so forth.

Example Processes

FIGS. 9A through 9G illustrate example implementations of a method 300 of timing an event utilizing video playback on a mobile device, such as the mobile device 100 illustrated in FIGS. 1A through 8. In general, operations of the disclosed method 300 may be performed in an arbitrary order, unless otherwise provided in the claims.

Figure 9A:
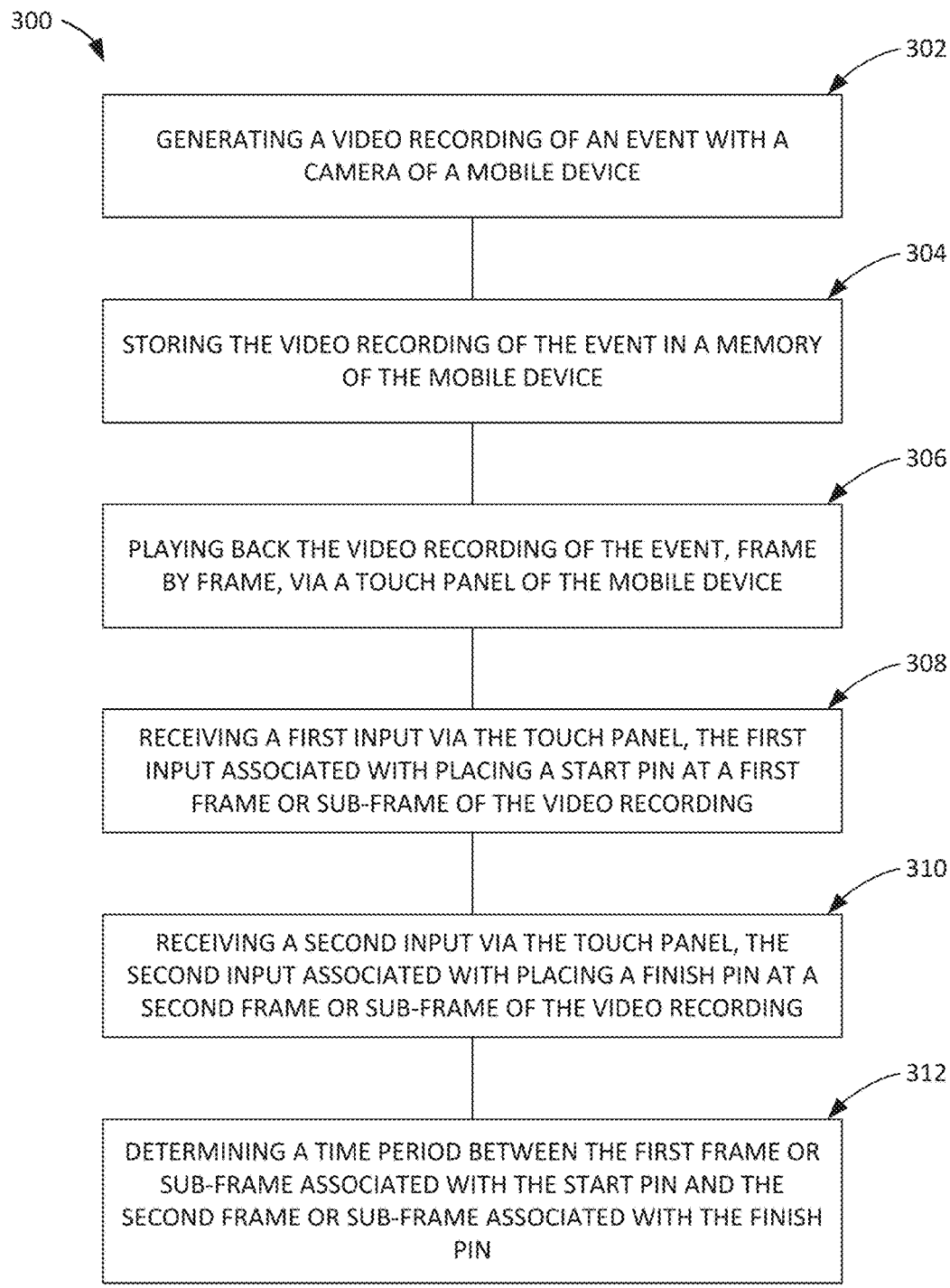
FIG. 9A is a flow diagram illustrating an example implementation of a method of timing events utilizing video playback on a mobile device, such as the mobile device shown in FIGS. 1A through 1F.

In an implementation shown in FIG. 9A, the method 300 includes: generating a video recording of an event with a camera of a mobile device (block 302); storing the video recording of the event in a memory of the mobile device (block 304); playing back the video recording of the event, frame by frame, via a touch panel of the mobile device (block 306); receiving a first input via the touch panel, the first input associated with placing a start pin at a first frame or sub-frame of the video recording (block 308); receiving a second input via the touch panel, the second input associated with placing a finish pin at a second frame or sub-frame of the video recording (block 310); and determining a time period between the first frame or sub-frame associated with the start pin and the second frame or sub-frame associated with the finish pin (block 312).

Figure 9B:
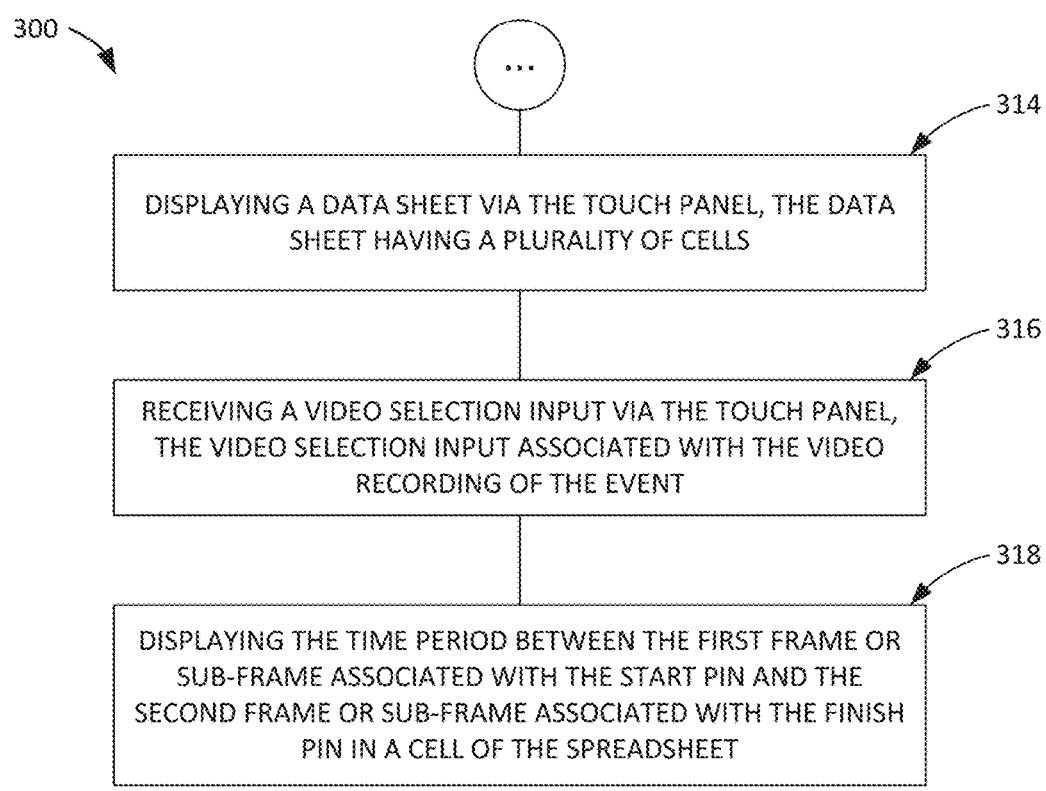
FIG. 9B is a flow diagram illustrating another example implementation of the method shown in FIG. 9A.

As shown in FIG. 9B, the method 300 may further include: displaying a data sheet via the touch panel, the data sheet having a plurality of cells (block 314); receiving a video selection input via the touch panel, the video selection input associated with the video recording of the event (block 316); and in response to receiving the video selection input via the touch panel, displaying the time period between the first frame or sub-frame associated with the start pin and the second frame or sub-frame associated with the finish pin in a cell of the spreadsheet (block 318).

Figure 9C:
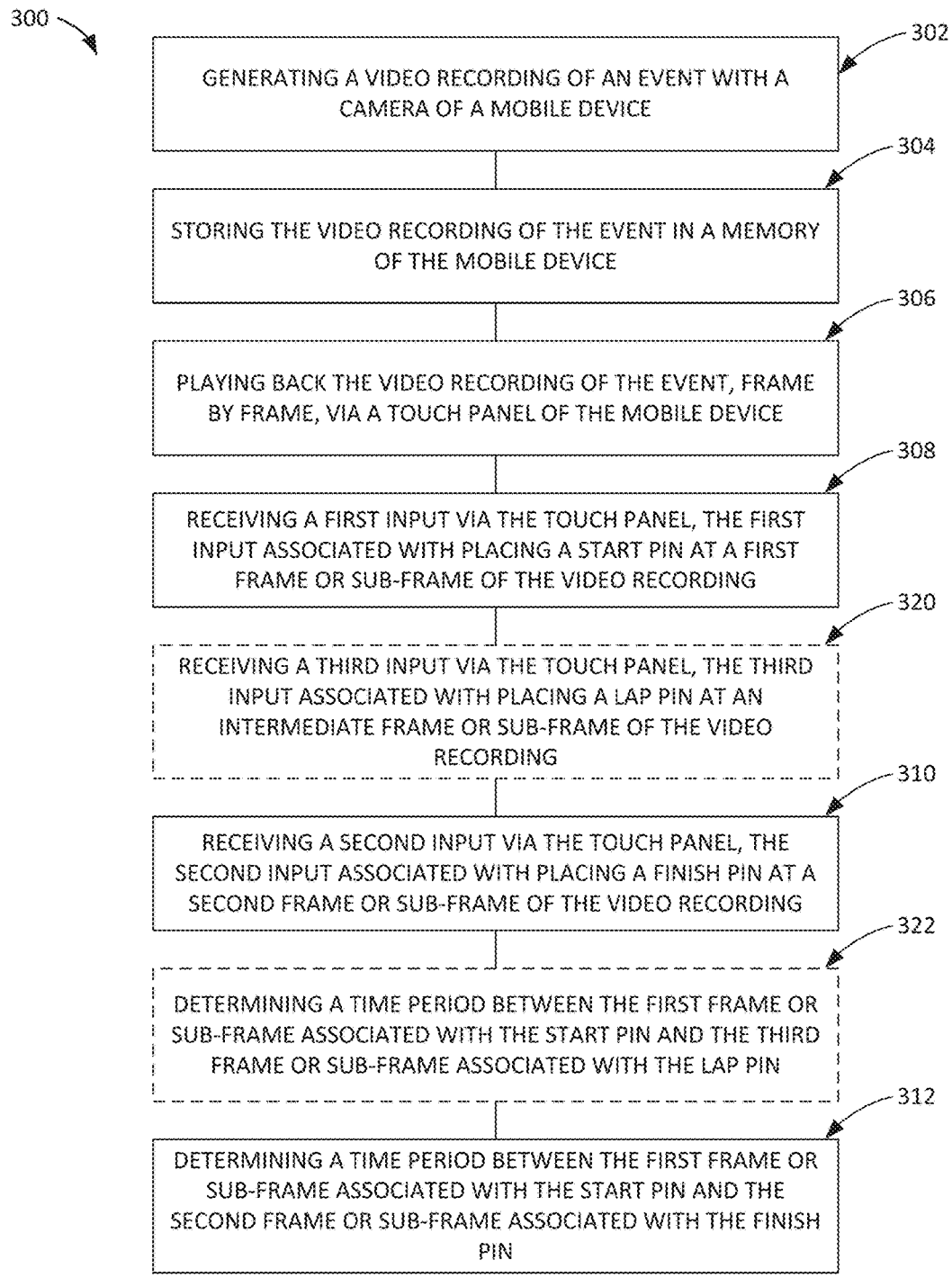
FIG. 9C is a flow diagram illustrating another example implementation of the method shown in FIG. 9A.
Figure 9D:
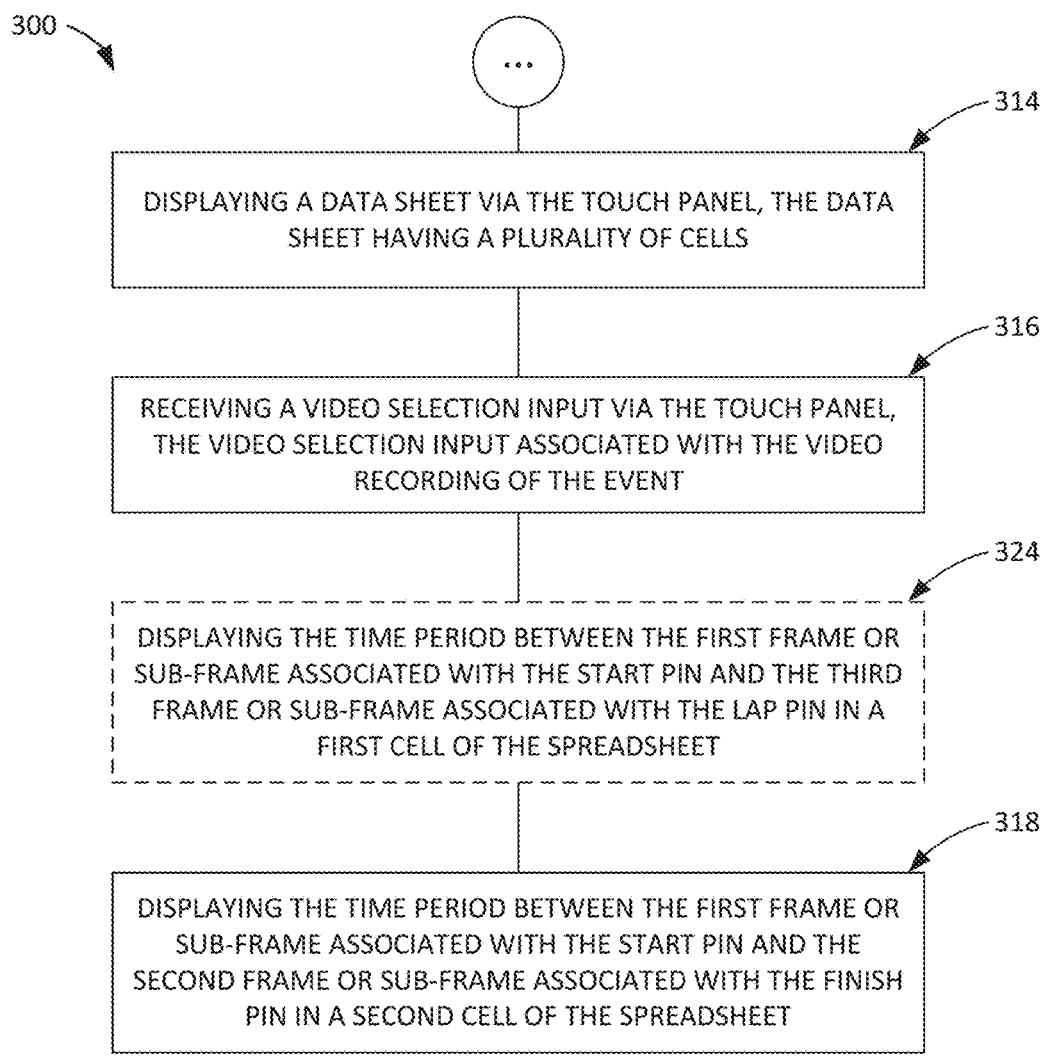
FIG. 9D is a flow diagram illustrating another example implementation of the method shown in FIG. 9A.

In some implementations (e.g., as shown in FIG. 9C), the method 300 further includes: receiving a third input via the touch panel, the third input received after the first input and before the second input, the third input associated with placing a lap pin at an intermediate frame or sub-frame between the first frame or sub-frame of the video recording and the second frame or sub-frame of the video recording (block 320); and determining a time period between the first frame or sub-frame associated with the start pin and the intermediate frame or sub-frame associated with the lap pin (block 322). As shown in FIG. 9D, in such implementations, the method 300 may include: displaying a data sheet via the touch panel, the data sheet having a plurality of cells (block 314); receiving a video selection input via the touch panel, the video selection input associated with the video recording of the event (block 316); and in response to receiving the video selection input via the touch panel, displaying the time period between the first frame or sub-frame associated with the start pin and the intermediate frame or sub-frame associated with the lap pin in a first cell of the spreadsheet (block 324), and further displaying the time period between the first frame or sub-frame associated with the start pin and the second frame or sub-frame associated with the finish pin in a second cell of the spreadsheet (block 318).

Figure 9E:
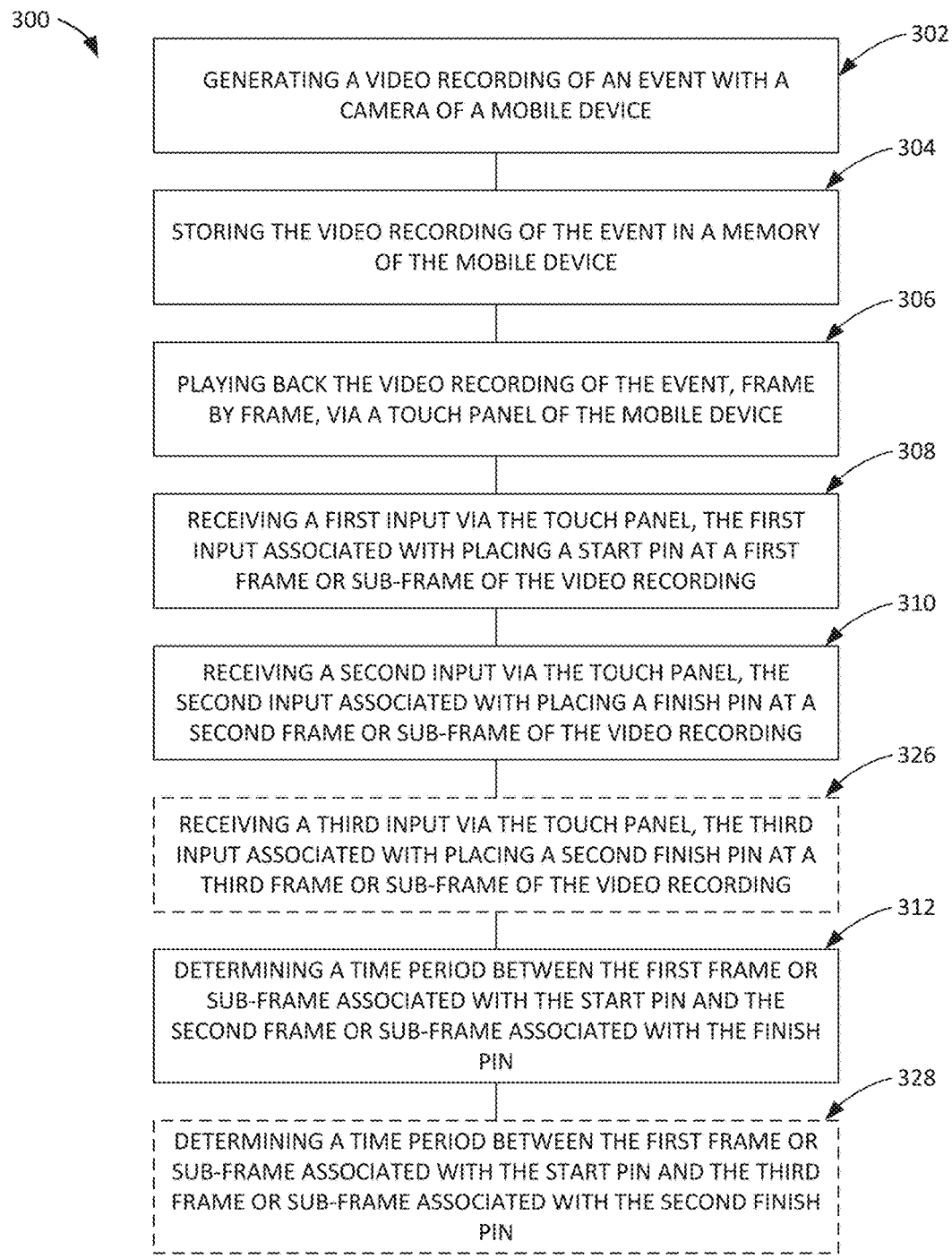
FIG. 9E is a flow diagram illustrating another example implementation of the method shown in FIG. 9A.
Figure 9F:
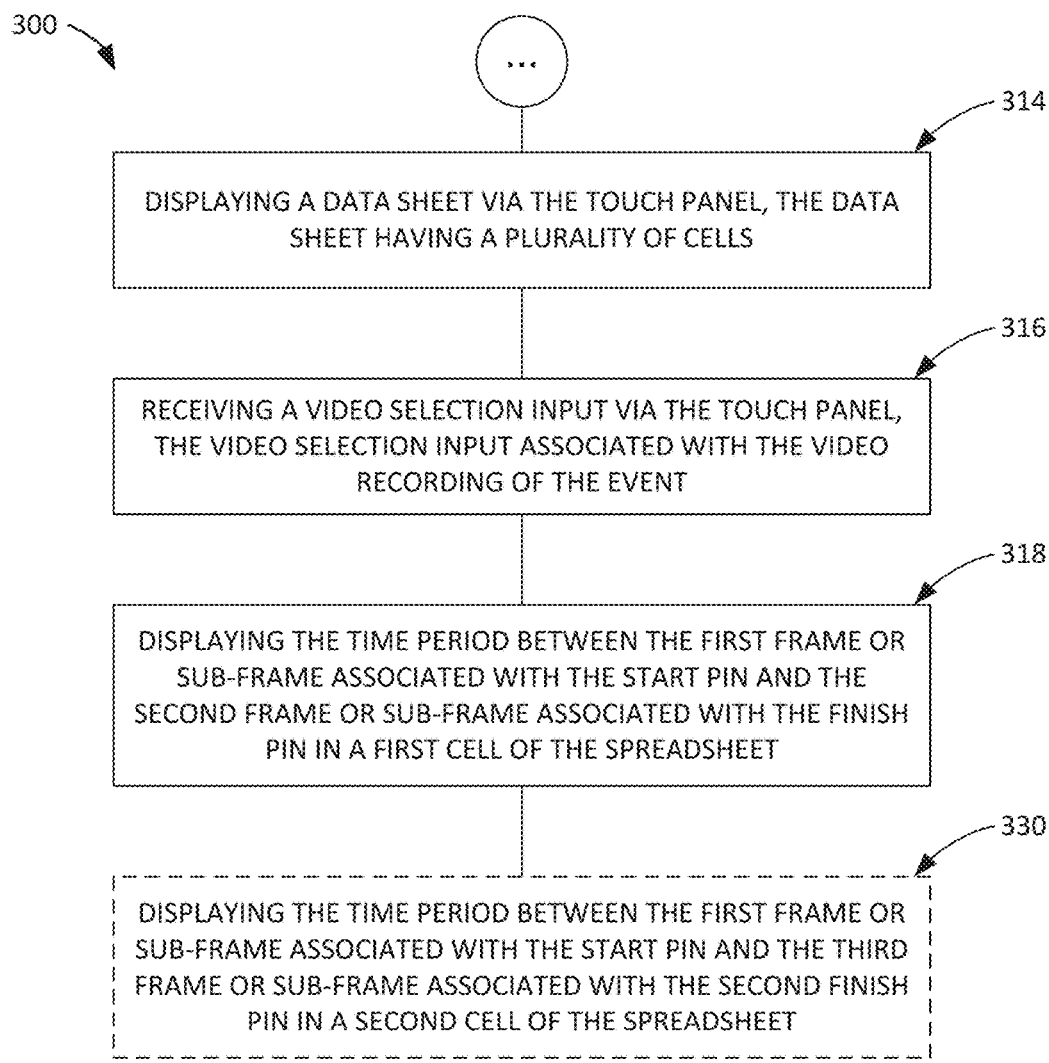
FIG. 9F is a flow diagram illustrating another example implementation of the method shown in FIG. 9A.

In some implementations (e.g., as shown in FIG. 9E), the method 300 further includes: receiving a third input via the touch panel, the third input received after the second input, the third input associated with placing a second finish pin at a third frame or sub-frame of the video recording (block 326); and determining a time period between the first frame or sub-frame associated with the start pin and the third frame or sub-frame associated with the second finish pin (block 328). As shown in FIG. 9F, in such implementations, the method 300 may include: displaying a data sheet via the touch panel, the data sheet having a plurality of cells (block 314); receiving a video selection input via the touch panel, the video selection input associated with the video recording of the event (block 316); and in response to receiving the video selection input via the touch panel, displaying the time period between the first frame or sub-frame associated with the start pin and the second frame or sub-frame associated with the finish pin in a first cell of the spreadsheet (block 318), and further displaying the time period between the first frame or sub-frame associated with the start pin and the third frame or sub-frame associated with the second finish pin in a second cell of the spreadsheet (block 330).

Figure 9G:
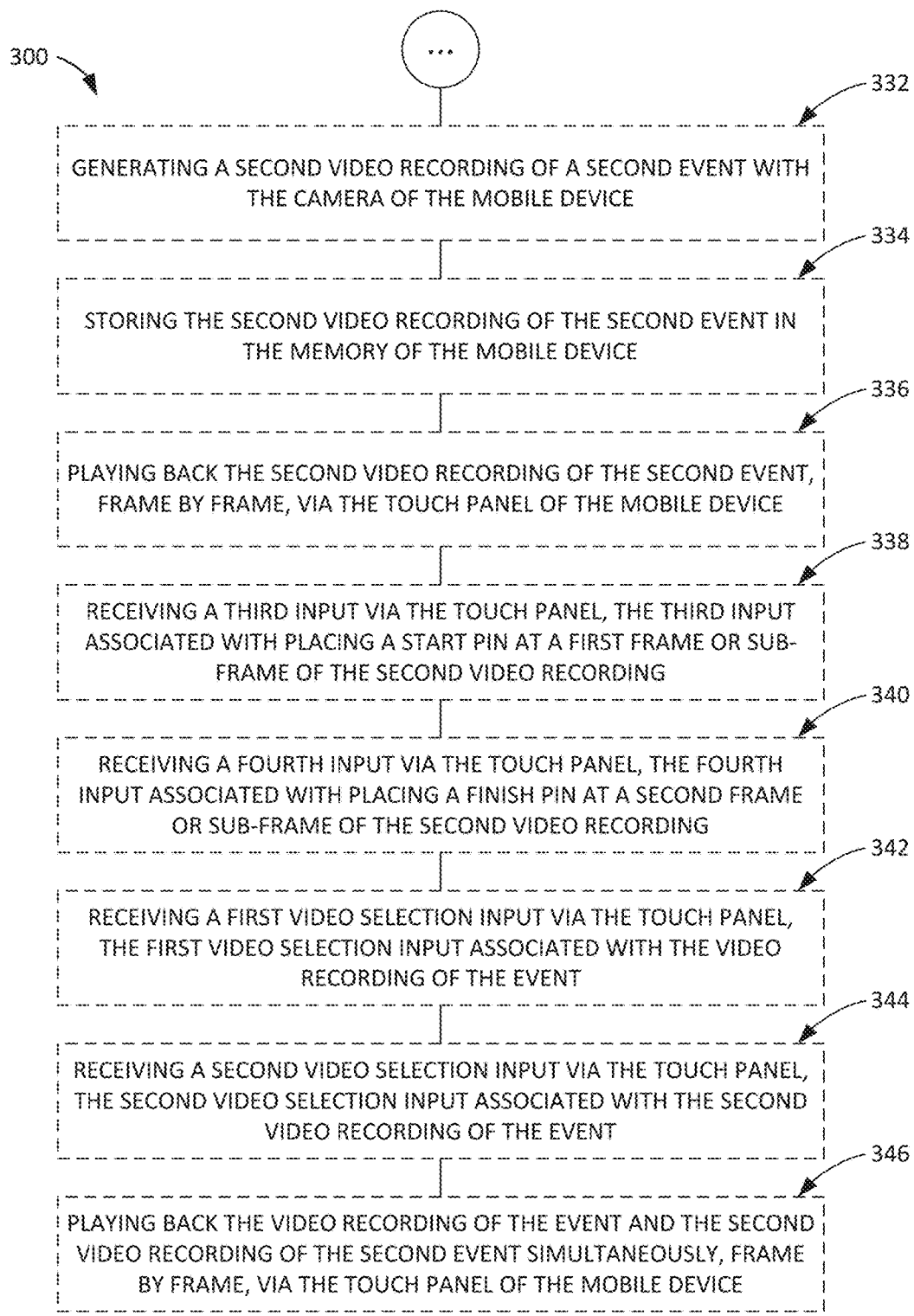
FIG. 9G is a flow diagram illustrating another example implementation of the method shown in FIG. 9A.

In some implementations (e.g., as shown in FIG. 9G), the method 300 further includes operations directed to capturing multiple video recordings and performing a comparison of the multiple video recordings. For example, the method 300 can further include: generating a second video recording of a second event with the camera (block 332); storing the second video recording of the event in the memory (block 334); playing back the video recording of the event, frame by frame, via the touch panel (block 336); receiving a third input via the touch panel, the third input associated with placing a start pin at a first frame or sub-frame of the second video recording (block 338); receiving a fourth input via the touch panel, the fourth input associated with placing a finish pin at a second frame or sub-frame of the second video recording (block 340); receiving a first video selection input via the touch panel, the first video selection input associated with the video recording of the event (block 342); receiving a second video selection input via the touch panel, the second video selectin input associated with the second video recording of the event (block 344); and playing back the video recording of the event and the second video recording of the second event simultaneously, frame by frame, including each respective start pin and finish pin, via the touch panel (block 346).

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., software modules 118) that perform specified tasks when executed on a processor (e.g., processor 114). These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

It is to be understood that the present application is defined by the appended claims. Although embodiments of the present application have been illustrated and described herein, it is apparent that various modifications may be made by those skilled in the art without departing from the scope and spirit of this disclosure.

What is claimed is:

1. A system for timing an event utilizing video playback on a mobile device, comprising:
a mobile device including a processor, a touch panel, and a camera, the processor being communicatively coupled to a memory, the memory having one or more software modules stored thereon, the one or more software modules being executable by the processor to cause the mobile device to:
generate a video recording of an event with the camera, the video recording of the event including at least one event participant recorded by the camera during the event, the video recording of the event further including an event starting point and an event end point recorded by the camera during the event;
store the video recording of the event in the memory;
play back the video recording of the event, frame by frame, via the touch panel;
receive a first input via the touch panel, the first input associated with placing a start pin at a first frame or sub-frame of the video recording to indicate departure of the at least one event participant from the event starting point in the video recording of the event;
receive a second input via the touch panel, the second input associated with placing a finish pin at a second frame or sub-frame of the video recording to indicate arrival of the at least one event participant at the event end point in the video recording of the event; and determine an event completion time for the at least one event participant based on a time period between the first frame or sub-frame associated with the start pin and the second frame or sub-frame associated with the finish pin.

2. The system as recited in claim 1, wherein the one or more software modules, when executed by the processor, further cause the mobile device to:

display a data sheet via the touch panel, the data sheet having a plurality of cells;

receive a video selection input via the touch panel, the video selection input associated with the video recording of the event; and in response to receiving the video selection input via the touch panel, display the time period between the first frame or sub-frame associated with the start pin and the second frame or sub-frame associated with the finish pin in a cell of the data sheet.

3. The system as recited in claim 1, wherein the one or more software modules, when executed by the processor, further cause the mobile device to:

receive a third input via the touch panel, the third input received after the first input and before the second input, the third input associated with placing a lap pin at an intermediate frame or sub-frame between the first frame or sub-frame of the video recording and the second frame or sub-frame of the video recording; and determine a time period between the first frame or sub-frame associated with the start pin and the intermediate frame or sub-frame associated with the lap pin.

4. The system as recited in claim 3, wherein the one or more software modules, when executed by the processor, further cause the mobile device to:

display a data sheet via the touch panel, the data sheet having a plurality of cells;

receive a video selection input via the touch panel, the video selection input associated with the video recording of the event; and in response to receiving the video selection input via the touch panel, display the time period between the first frame or sub-frame associated with the start pin and the intermediate frame or sub-frame associated with the lap pin in a first cell of the data sheet, and further display the time period between the first frame or sub-frame associated with the start pin and the second frame or sub-frame associated with the finish pin in a second cell of the data sheet.

5. The system as recited in claim 1, wherein the one or more software modules, when executed by the processor, further cause the mobile device to:

receive a third input via the touch panel, the third input received after the second input, the third input associated with placing a second finish pin at a third frame or sub-frame of the video recording; and determine a time period between the first frame or sub-frame associated with the start pin and the third frame or sub-frame associated with the second finish pin.

6. The system as recited in claim 5, wherein the one or more software modules, when executed by the processor, further cause the mobile device to:

display a data sheet via the touch panel, the data sheet having a plurality of cells;

receive a video selection input via the touch panel, the video selection input associated with the video recording of the event; and in response to receiving the video selection input via the touch panel, display the time period between the first frame or sub-frame associated with the start pin and the second frame or sub-frame associated with the finish pin in a first cell of the data sheet, and further display the time period between the first frame or sub-frame associated with the start pin and the third frame or sub-frame associated with the second finish pin in a second cell of the data sheet.

7. The system as recited in claim 1, wherein the one or more software modules, when executed by the processor, further cause the mobile device to:

generate a second video recording of a second event with the camera;

store the second video recording of the event in the memory;

play back the video recording of the event, frame by frame, via the touch panel;

receive a third input via the touch panel, the third input associated with placing a start pin at a first frame or sub-frame of the second video recording;

receive a fourth input via the touch panel, the fourth input associated with placing a finish pin at a second frame or sub-frame of the second video recording;

receive a first video selection input via the touch panel, the first video selection input associated with the video recording of the event;

receive a second video selection input via the touch panel, the second video selectin input associated with the second video recording of the event; and play back the video recording of the event and the second video recording of the second event, frame by frame, including each respective start pin and finish pin, via the touch panel.

8. A method of timing an event utilizing video playback on a mobile device, the method comprising:

generating a video recording of an event with a camera of a mobile device, the video recording of the event including at least one event participant recorded by the camera during the event, the video recording of the event further including an event starting point and an event end point recorded by the camera during the event;

storing the video recording of the event in a memory of the mobile device;

playing back the video recording of the event, frame by frame, via a touch panel of the mobile device;

receiving a first input via the touch panel, the first input associated with placing a start pin at a first frame or sub-frame of the video recording to indicate departure of the at least one event participant from the event starting point in the video recording of the event;

receiving a second input via the touch panel, the second input associated with placing a finish pin at a second frame or sub-frame of the video recording to indicate arrival of the at least one event participant at the event end point in the video recording of the event; and determining an event completion time for the at least one event participant based on a time period between the first frame or sub-frame associated with the start pin and the second frame or sub-frame associated with the finish pin.

9. The method as recited in claim 8, further comprising:

displaying a data sheet via the touch panel, the data sheet having a plurality of cells;

receiving a video selection input via the touch panel, the
video selection input associated with the video record-
ing of the event; and in response to receiving the video selection input via the
touch panel, displaying the time period between the
first frame or sub-frame associated with the start pin
and the second frame or sub-frame associated with the
finish pin in a cell of the data sheet.

10. The method as recited in claim 8, further comprising:
receiving a third input via the touch panel, the third input
received after the first input and before the second
input, the third input associated with placing a lap pin
at an intermediate frame or sub-frame between the first
frame or sub-frame of the video recording and the
second frame or sub-frame of the video recording; and determining a time period between the first frame or
sub-frame associated with the start pin and the inter-
mediate frame or sub-frame associated with the lap pin.

11. The method as recited in claim 10, further comprising:
displaying a data sheet via the touch panel, the data sheet
having a plurality of cells;

receiving a video selection input via the touch panel, the
video selection input associated with the video record-
ing of the event; and in response to receiving the video selection input via the
touch panel, displaying the time period between the
first frame or sub-frame associated with the start pin
and the intermediate frame or sub-frame associated
with the lap pin in a first cell of the data sheet, and
further displaying the time period between the first
frame or sub-frame associated with the start pin and the
second frame or sub-frame associated with the finish
pin in a second cell of the data sheet.

12. The method as recited in claim 8, further comprising:
receiving a third input via the touch panel, the third input
received after the second input, the third input associ-
ated with placing a second finish pin at a third frame or
sub-frame of the video recording; and determining a time period between the first frame or
sub-frame associated with the start pin and the third
frame or sub-frame associated with the second finish
pin.

13. The method as recited in claim 12, further comprising:
displaying a data sheet via the touch panel, the data sheet
having a plurality of cells;

receiving a video selection input via the touch panel, the
video selection input associated with the video record-
ing of the event; and in response to receiving the video selection input via the
touch panel, displaying the time period between the
first frame or sub-frame associated with the start pin
and the second frame or sub-frame associated with the
finish pin in a first cell of the data sheet, and further
displaying the time period between the first frame or
sub-frame associated with the start pin and the third
frame or sub-frame associated with the second finish
pin in a second cell of the data sheet.

14. The method as recited in claim 8, further comprising:
generating a second video recording of a second event
with the camera;

storing the second video recording of the event in the
memory;

playing back the video recording of the event, frame by
frame, via the touch panel;

receiving a third input via the touch panel, the third input
associated with placing a start pin at a first frame or
sub-frame of the second video recording;

receiving a fourth input via the touch panel, the fourth
input associated with placing a finish pin at a second
frame or sub-frame of the second video recording;

receiving a first video selection input via the touch panel,
the first video selection input associated with the video
recording of the event;

receiving a second video selection input via the touch
panel, the second video selectin input associated with
the second video recording of the event; and playing back the video recording of the event and the
second video recording of the second event simultane-
ously, frame by frame, including each respective start
pin and finish pin, via the touch panel.

15. A non-transitory computer readable medium with one
or more software modules stored thereon, the one or more
software modules being executable by a processor of a
mobile device to cause the mobile device to:

generate a video recording of an event with a camera of
the mobile device, the video recording of the event
including at least one event participant recorded by the
camera during the event, the video recording of the
event further including an event starting point and an
event end point recorded by the camera during the
event;

store the video recording of the event in a memory of the
mobile device;

play back the video recording of the event, frame by
frame, via a touch panel of the mobile device;

receive a first input via the touch panel, the first input
associated with placing a start pin at a first frame or
sub-frame of the video recording to indicate departure
of the at least one event participant from the event
starting point in the video recording of the event;

receive a second input via the touch panel, the second
input associated with placing a finish pin at a second
frame or sub-frame of the video recording to indicate
arrival of the at least one event participant at the event
end point in the video recording of the event; and determine an event completion time for the at least one
event participant based on a time period between the
first frame or sub-frame associated with the start pin
and the second frame or sub-frame associated with the
finish pin.

16. The non-transitory computer readable medium as
recited in claim 15, wherein the one or more software
modules, when executed by the processor, further cause the
mobile device to:

display a data sheet via the touch panel, the data sheet
having a plurality of cells;

receive a video selection input via the touch panel, the
video selection input associated with the video record-
ing of the event; and in response to receiving the video selection input via the
touch panel, display the time period between the first
frame or sub-frame associated with the start pin and the
second frame or sub-frame associated with the finish
pin in a cell of the data sheet.

17. The non-transitory computer readable medium as
recited in claim 15, wherein the one or more software
modules, when executed by the processor, further cause the
mobile device to:

receive a third input via the touch panel, the third input
received after the first input and before the second
input, the third input associated with placing a lap pin
at an intermediate frame or sub-frame between the first
frame or sub-frame of the video recording and the
second frame or sub-frame of the video recording; and determine a time period between the first frame or sub-frame associated with the start pin and the intermediate frame or sub-frame associated with the lap pin.

18. The non-transitory computer readable medium as recited in claim 17, wherein the one or more software modules, when executed by the processor, further cause the mobile device to:
   display a data sheet via the touch panel, the data sheet having a plurality of cells;
   receive a video selection input via the touch panel, the video selection input associated with the video recording of the event; and
   in response to receiving the video selection input via the touch panel, display the time period between the first frame or sub-frame associated with the start pin and the intermediate frame or sub-frame associated with the lap pin in a first cell of the data sheet, and further display the time period between the first frame or sub-frame associated with the start pin and the second frame or sub-frame associated with the finish pin in a second cell of the data sheet.

19. The non-transitory computer readable medium as recited in claim 15, wherein the one or more software modules, when executed by the processor, further cause the mobile device to:
   receive a third input via the touch panel, the third input received after the second input, the third input associated with placing a second finish pin at a third frame or sub-frame of the video recording; and
   determine a time period between the first frame or sub-frame associated with the start pin and the third frame or sub-frame associated with the second finish pin.

20. The non-transitory computer readable medium as recited in claim 19, wherein the one or more software modules, when executed by the processor, further cause the mobile device to:
   display a data sheet via the touch panel, the data sheet having a plurality of cells;
   receive a video selection input via the touch panel, the video selection input associated with the video recording of the event; and
   in response to receiving the video selection input via the touch panel, display the time period between the first frame or sub-frame associated with the start pin and the second frame or sub-frame associated with the finish pin in a first cell of the data sheet, and further display the time period between the first frame or sub-frame associated with the start pin and the third frame or sub-frame associated with the second finish pin in a second cell of the data sheet.

* * * * *